(12) United States Patent
Takano et al.

(10) Patent No.: US 8,158,020 B2
(45) Date of Patent: Apr. 17, 2012

(54) LIQUID CRYSTAL ELEMENT, OPTICAL PATH DEFLECTING ELEMENT, AND IMAGE DISPLAYING APPARATUS

(75) Inventors: Yohei Takano, Kanagawa (JP); Hiroyuki Sugimoto, Kanagawa (JP); Toshiaki Tokita, Kanagawa (JP); Koh Fujimura, Tokyo (JP); Yasuyuki Takiguchi, Kanagawa (JP); Yumi Matsuki, Kanagawa (JP); Haruki Amagawa, Shizuoka (JP); Toshiaki Nonaka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 458 days.

(21) Appl. No.: 11/913,378

(22) PCT Filed: Mar. 1, 2007

(86) PCT No.: PCT/JP2007/054494
§ 371 (c)(1),
(2), (4) Date: Nov. 1, 2007

(87) PCT Pub. No.: WO2007/100150
PCT Pub. Date: Sep. 7, 2007

(65) Prior Publication Data
US 2008/0204608 A1    Aug. 28, 2008

(30) Foreign Application Priority Data

Mar. 1, 2006 (JP) .................. 2006-054850
Mar. 1, 2006 (JP) .................. 2006-054851

(51) Int. Cl.
C09K 19/00 (2006.01)
C09K 19/06 (2006.01)
C09K 19/32 (2006.01)
C09K 19/52 (2006.01)

(52) U.S. Cl. ........... 252/299.01; 252/299.6; 252/299.61; 252/299.62; 252/299.63; 252/299.64; 252/299.65; 252/299.66; 430/20; 428/1.1; 349/1; 349/56; 349/117

(58) Field of Classification Search ............. 252/299.01, 252/299.6–0.66, 299.61, 299.62, 299.63, 252/299.64, 299.65, 299.66; 430/20, 270.1; 428/1.1; 349/117, 1, 56
See application file for complete search history.

(56) References Cited

U.S. PATENT DOCUMENTS

| 5,387,371 | A | * | 2/1995 | Pausch et al. | ............ 252/299.65 |
| 5,411,668 | A | * | 5/1995 | Pollmann et al. | ............ 210/638 |
| 5,441,668 | A | * | 8/1995 | Hornung et al. | ......... 252/299.01 |
| 6,280,653 | B1 | * | 8/2001 | Jones et al. | ............ 252/299.61 |
| 6,838,128 | B1 | * | 1/2005 | Wand et al. | .................. 428/1.1 |
| 7,304,705 | B2 | * | 12/2007 | Sugimoto et al. | ............ 349/141 |

FOREIGN PATENT DOCUMENTS

| JP | 5 279299 | 10/1993 |
| JP | 5 313116 | 11/1993 |
| JP | 6 18940 | 1/1994 |
| JP | 6 206841 | 7/1994 |
| JP | 6 306363 | 11/1994 |
| JP | 7 62349 | 3/1995 |
| JP | 9 133904 | 5/1997 |

(Continued)

OTHER PUBLICATIONS

Pausch, Axel E. et al., "New Fluorinated Heterocyclic Compounds for Improved FLC-Mixtures", Proceedings SPIE The International Society for Optical Engineering, vol. 1665, pp. 128-133, 1992.

(Continued)

*Primary Examiner* — Geraldina Visconti
(74) *Attorney, Agent, or Firm* — Oblon, Spivak, McClelland, Maier & Neustadt, L.L.P.

(57) ABSTRACT

A liquid crystal element comprising a pair of transparent substrates, a liquid crystal layer which fills in between the pair of substrates and can form a chiral smectic C phase in homeotropic orientation, and an electrode which generates, at least, an electric field (parallel electric field) in directions parallel to a principal face of the substrate for the liquid crystal layer is provided, wherein the liquid crystal layer comprises, at least, a chiral compound of the following general formula (1-I) or a chiral compound of the following general formula (2-I) and a chiral compound of the following general formula (2 -II) in a base liquid crystal material which can provide a phase sequence of an isotropic liquid phase, a nematic phase, a smectic A phase and a smectic C phase from a higher temperature side, wherein $R^1$, $A^2$, $Z^1$, $Z^2$, m and l in formula (1-I), X, $R^1$, $R^2$, and * in formula (2-I), and X, $R^3$, $R^4$, $R^5$, and * in formula (2-II) are defined in the specification.

(1-I)

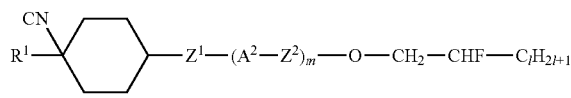

(2-I)

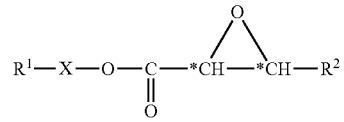

(2-II)

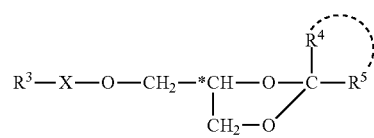

1 Claim, 9 Drawing Sheets

FOREIGN PATENT DOCUMENTS

| | | |
|---|---|---|
| JP | 10 133135 | 5/1998 |
| JP | 2939826 | 6/1999 |
| JP | 3034024 | 2/2000 |
| JP | 2002 328402 | 11/2002 |
| JP | 2003 280041 | 10/2003 |
| JP | 2004 184522 | 7/2004 |
| JP | 3547015 | 7/2004 |
| JP | 2005 338804 | 12/2005 |
| WO | 97 04039 | 2/1997 |
| WO | 97 24351 | 7/1997 |
| WO | 99 04383 | 1/1999 |

OTHER PUBLICATIONS

"Crystal Optics", Japan Society of Applied Physics, Optical Society of Japan, p. 198, 1975.

* cited by examiner

Vs
RECTANGULAR
WAVE ALTERNATING
VOLTAGE

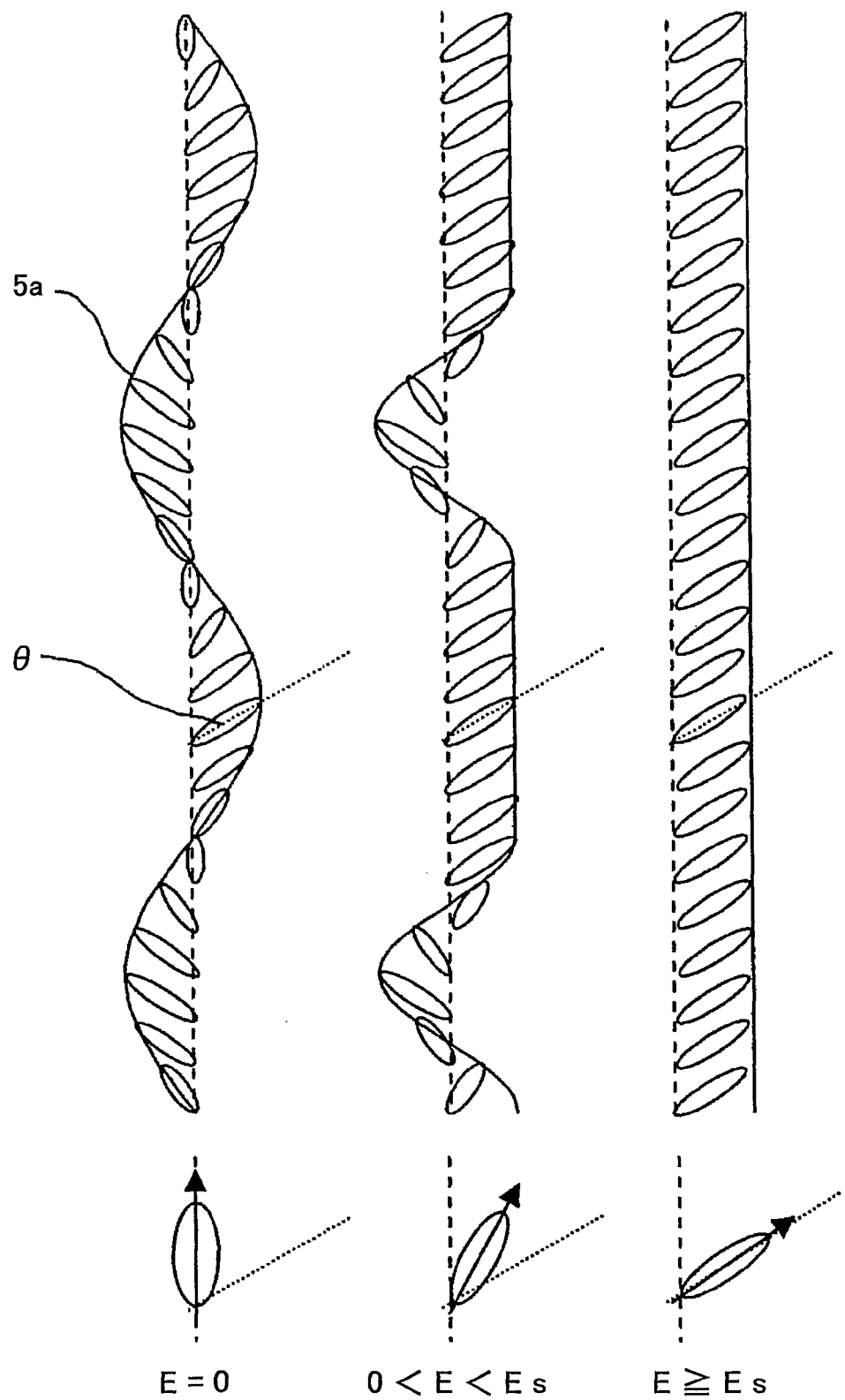

LIQUID CRYSTAL ELEMENT, OPTICAL PATH DEFLECTING ELEMENT, AND IMAGE DISPLAYING APPARATUS

TECHNICAL FIELD

The present invention relates to a liquid crystal element, an optical path deflecting element, and an image displaying apparatus.

BACKGROUND ART

Terms used in this specification are defined prior to descriptions of conventional techniques.

An "optical path deflecting element" refers to an optical element that is capable of switching an optical path of light by deflecting the optical path, that is, by parallel shifting exit light with respect to incident light or rotating it by a certain angle, in response to an external electric signal, or by combining both of them. In the following descriptions, the degree of parallel shifting with respect to optical path deflection through the shifting is referred to as a "shift amount" and the degree of rotation with respect to optical path deflection through the rotation is referred to as a "rotation angle". Also, an "optical deflecting device" refers to a device which deflects the optical path of light and includes the optical deflecting element as described above.

A "pixel shift element (picture element shifting element)" refers to an optical path deflecting device of an image displaying apparatus which includes, at least, an image displaying element in which plural picture elements capable of controlling light according to image information are two-dimensionally arrayed, a light source which illuminates the image displaying element, an optical member for observing an image pattern displayed on the image displaying element, and the optical path deflecting device which deflects an optical path between the image displaying element and the optical member, for each of plural sub-fields provided by temporally dividing an image field, in which apparatus the number of picture elements of the image displaying element is apparently increased by displaying an image pattern whose display is positionally shifted in accordance with the deflection of an optical path for each sub-field which is provided by the optical path deflecting element, thereby conducting display. Therefore, basically, the optical path deflecting element or optical path deflecting device defined above may be used as the optical deflecting means (a pixel shift element (picture element shifting element)).

Conventionally, various kinds of techniques relating to, for example, an optical path deflecting element (or optical deflection element) or pixel shift element using liquid crystal material and an image displaying apparatuses using it have been proposed (e.g., see Japanese Patent Application Publication No. 06-018940, Japanese Patent Application Publication No. 09-133904, Japanese Patent No. 2939826, Japanese Patent Application Publication No. 05-313116, Japanese Patent Application Publication No. 06-324320, and Japanese Patent Application Publication No. 10-133135). However, in the conventional optical path deflecting elements or pixel shift elements have various problems including the following:

high cost, large size of device, light loss, generation of optical noise such as ghosts, and/or image resolution decrease, due to complexity of configuration;

problems relating to positioning accuracy, durability, oscillation, and sound, particularly in applications where a movable component is used; and problems relating to response speed in nematic liquid crystals, etc.

In such a situation, the inventors or applicant have/has previously proposed an optical path deflecting element with a particular configuration (see Japanese Patent Application Publication No. 2002-328402) for the purposes of providing an optical path deflecting element or device which may mitigate the problems in the conventional optical path deflecting elements, that is, problems such as high cost, large size of device, light loss, and generation of optical noise, due to complexity of configuration, have a simple and compact configuration and low light loss, low optical noise and low image resolution decrease, and reduce the cost thereof.

The optical path deflecting element 1 includes a pair of transparent substrates 2 and 3, an orientation film 4 provided on at least one of the substrates 2 and 3, a liquid crystal 5 which fills in between the substrates 2 and 3 and which is in a chiral smectic C phase for providing a homeotropic orientation, and at least one pair 6 of electrodes 6a and 6b for applying electrical field to the liquid crystal 5, wherein the electrode pair 6 is connected to a power source 7 so that the electrical field may be applied to a layer of the liquid crystal 5. Since the optical path deflecting element utilizes the liquid crystal 5 in a chiral smectic C phase, problems such as high cost, large size of device, light loss and optical noise, due to complexity of configuration, may be mitigated, and the lower responsiveness in, for example, the conventional smectic A-type liquid crystals or nematic liquid crystals may be improved compared to the conventional optical path deflecting elements so that high speed response can be attained.

However, in order to obtain a practical optical path shift amount of several µm to several dozen µm with such an optical path deflecting element, it may be necessary to set the thickness of the liquid crystal layer to a very large thickness of several dozen µm to several hundred µm (e.g., see "Crystal Optics" Japan Society of Applied Physics, Optical Society of Japan, page 198). Generally, when the thickness of a liquid crystal layer is increased, the influence of orientation regulation power from the surface of a substrate may be reduced at the center portion of the liquid crystal layer, and thereby, it may be difficult to maintain uniform orientation throughout the liquid crystal layer. For example, the degree of orientation at the center portion of the liquid crystal layer may be lowered so as to cause white turbidity. Therefore, it may be the most important issue to attain and maintain uniform orientation throughout the liquid crystal layer in an optical path deflecting element as described above.

For this reason, the inventors or applicant have/has previously proposed, for example, an optical path deflecting element including a liquid crystal layer made of a liquid crystal material which does not form a smectic A phase at a temperature higher than that of a chiral smectic C phase (see Japanese Patent Application Publication No. 2003-280041 and Japanese Patent Application Publication No. 2002-328402) and a method including the steps of containing, for example, the monomer(s) of a polymeric material in a liquid crystal layer, maintaining the temperature of the liquid crystal layer to that for providing the smectic A phase so as to adjust the orientation of a molecule, conducting photo-polymerization to form a fibrous or network system of the polymeric material, and then cooling it to a temperature for providing the chiral smectic C phase (see Japanese Patent Application Publication No. 2004-184522). However, the freedom of the selection of liquid crystal materials may be limited with respect to the technique disclosed in Japanese Patent Application No. 2003-280041, and a side effect such as an influence on response speed or optical characteristics due to the existence of a polymeric system may be caused with respect to the technique disclosed in Japanese Patent Application No. 2004-184522.

Also, there has been proposed a method of adjusting, for example, the quantities, kinds and relative concentrations of added chiral compounds, and the spiral pitch of a nematic (N*) phase of a ferroelectric liquid crystal mixture having a large spontaneous polarization and excellent orientation for such a mixture and a displaying element using it (see Japanese Patent No. 3034024). The disclosure in this document is directed to a displaying element that uses surface-stabilized ferroelectric liquid crystal with a planar orientation.

It is disclosed that, in surface-stabilized ferroelectric liquid crystal elements, generally, it is necessary to set the thickness of a liquid crystal layer to approximately 2 µm in order to obtain the uniform orientation (single planar orientation: dis-integrated-spiral monodomain orientation), high-speed response, and good contrast, and particularly, the spiral pitch with respect to the nematic (N*) phase has to be approximately five or greater times the thickness of the liquid crystal layer, namely, approximately 10 µm or greater, in order to realize single planar orientation. Also, there is disclosed an example of a method for adding a dopant for satisfying such conditions. Furthermore, it is disclosed that the spiral pitch has to be increased for a displaying apparatus with a layer which is thicker than usual, for example, a displaying apparatus which operates in guest-host mode, and it is shown that the increase of spiral pitch due to the mixture disclosed in the document may be effective. Also, since the spiral pitch is sufficiently large relative to the thickness in an operating temperature range of a surface-stabilized element, the influence of the spiral pitch with respect to the Smectic C phase on operations of the element may be negligible.

On the other hand, the design concept of a liquid crystal material for surface-stabilized one as described above may not be applied for a liquid crystal element in which a chiral smectic C phase lies in a vertical orientation (spiral retaining orientation) and the thickness of a liquid crystal layer is very large, namely, approximately several dozen µm, such as a liquid crystal element used in an optical path deflecting element according to the present invention.

That is, only the improvement of orientation or increase of spontaneous polarization by means of adjustment of the spiral pitch with respect to a nematic (N*) phase, as disclosed in Japanese Patent No. 3034024, is insufficient, and therefore, it may be important to improve the characteristic of such an element by optimizing the spiral pitch with respect to a chiral nematic C phase within an operating temperature range. For example, when a liquid crystal mixture in which the spiral pitch with respect to a nematic (N*) phase is sufficiently large is used, the spiral pitch with respect to the smectic C phase tends to increase. If such a material is used to construct a vertical orientation liquid crystal element with a liquid crystal layer having a very large thickness of approximately several dozen µm, uniform orientation is not necessarily attained and a certain liquid crystal domain may be easily generated during operation, so that characteristic degradation may be caused by means of light scattering at domain walls.

DISCLOSURE OF THE INVENTION

Problems to be Solved by the Invention

One of the object(s) of the present invention is to provide at least one of a liquid crystal element, optical path deflecting element and image displaying apparatus, which is/are different from the prior art cases.

Means for Solving the Problem

According to one aspect of the present invention, there can be provided a liquid crystal element comprising a pair of transparent substrates, a liquid crystal layer which fills in between the pair of substrates and can form a chiral smectic C phase in homeotropic orientation, and an electrode which generates, at least, an electric field (parallel electric field) in directions parallel to a principal face of the substrate for the liquid crystal layer, wherein the liquid crystal layer comprises, at least, a chiral compound of the following general formula (2-I)

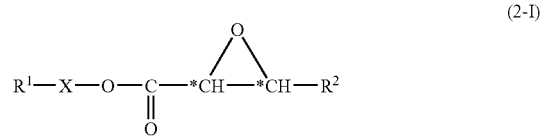

(2-I)

and a chiral compound of the following general formula (2-II)

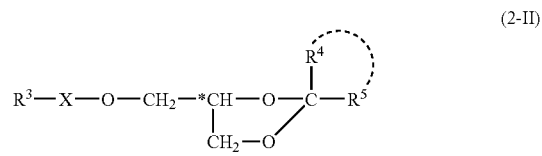

(2-II)

in a base liquid crystal material which can provide a phase sequence of an isotropic liquid phase, a nematic phase, a smectic A phase and a smectic C phase from a higher temperature side, in which formula (2-I), an X group is $-(A^1)_h-(B^1)_i-(A^2)_j-(B^2)_k-(A^3)_l-$, $R^1$ represents a linear alkyl group or alkoxy group whose carbon number is any of 3 to 12, $R^2$ represents an alkyl group whose carbon number is any of 3 to 12 and which may be branched, * represents a chiral center, each of h and j is 0, 1 or 2, each of i and k is 0 or 1, l is 0, 1 or 2, wherein i is 0 when both or one of h and j is 0, k is 0 when l is 0, and h+j+l is 2 or 3, each of $A^1$ and $A^2$ represents a group selected from formulas (2-a)

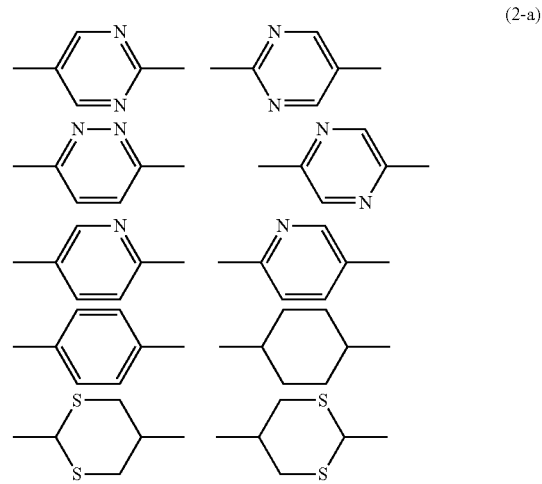

(2-a)

-continued

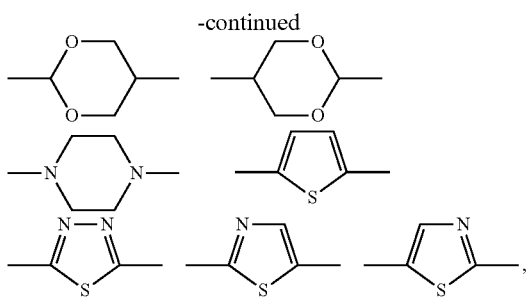

$A^3$ represents a group selected from formulas (2-b)

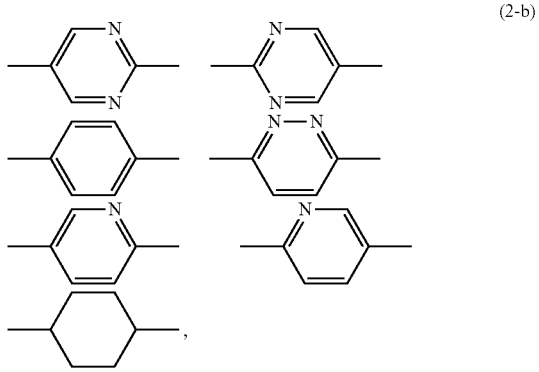

(2-b)

each of $B^1$ and $B^2$ is —CO—O—, —O—CO—, —CH$_2$O— or —OCH$_2$—, and in which formula (2-II), an X group is -$(A^1)_h$-$(B^1)_i$-$(A^2)_j$-$(B^2)_k$-$(A^3)_l$-, $R^3$ represents an alkyl group or alkoxy group whose carbon number is any of 3 to 12 and which may be branched, each of $R^4$ and $R^5$ represents a linear alkyl group whose carbon number is any of 3 to 5 or an alkyl group which has a six or more-membered ring structure and whose ends bond to each other, and each of $A^1, A^2, A^3, B^1, B^2$, h, i, j, k and l is defined identically to that of formula (2-I) and may be independently identical to or different from that of formula (2-I).

According to another aspect of the present invention, there can be provided a liquid crystal element comprising a pair of transparent substrates, a liquid crystal layer which fills in between the pair of substrates and can form a chiral smectic C phase in homeotropic orientation, and an electrode which generates, at least, an electric field (parallel electric field) in directions parallel to a principal face of the substrate for the liquid crystal layer, wherein the liquid crystal layer comprises, at least, a chiral compound of the following general formula (1-I)

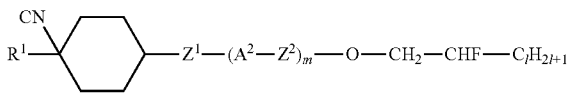

(1-I)

in a base liquid crystal material which can provide a phase sequence of an isotropic liquid phase, a nematic phase, a smectic A phase and a smectic C phase from a higher temperature side, wherein $R^1$ is an alkyl group or alkenyl group whose carbon number is any of 1 to 15 and which is not substituted, one carbon of which is substituted with —CN, or at least one hydrogen atom of which is replaced by F or Cl, a CH$_2$ group of which may be replaced by —O—, —CO—, —O—CO—, —CO—O— or —O—CO—O—, $A^2$ is 1,4-phenylene group, pyridine-2,5-diyl, pyrimidine-2,5-diyl, 1,3,4-thiadiazole-2,5-diyl, or 1,2,4-thiadiazole-3,5-diyl, one or two hydrogen atoms of which may be replaced by F, each of $Z^1$ and $Z^2$ is independently —CO—O—, —O—CO—, or a single bond, m=1 or 2, and $1 \leq l \leq 9$.

According to another aspect of the present invention, there can be provided an optical path deflecting element which deflects an optical path of light in response to an electric signal, which comprises the liquid crystal element as described above, and which makes light incident on the liquid crystal element be linearly polarized light, and sets a polarization plane of the linearly polarized light to be in directions orthogonal to a direction of an applied parallel electric field in the element, whereby a relative position of an optical path of exit light with respect to an optical path of incident light can be parallel shifted.

According to another aspect of the present invention, there can be provided an image displaying apparatus comprising an image displaying element in which plural picture elements capable of controlling light according to image information are two-dimensionally arrayed, a light source, an illumination device which illuminates the image displaying element, an optical device configured to observe an image pattern displayed on the image displaying element, a display driving device which forms an image field based on plural sub-fields provided by temporally dividing it, and an optical path deflecting element which deflects an optical path of light which exits from each picture element, in which apparatus the number of picture elements of the image displaying element is apparently increased by displaying on the image displaying element an image pattern corresponding to a display which is positionally shifted in accordance with a deflection of an optical path for each sub-field which is provided by the optical path deflecting element, thereby conducting display, which apparatus comprises the optical path deflecting element as described above as the optical path deflecting element.

ADVANTAGEOUS EFFECT OF THE INVENTION

According to one aspect of the present invention, there can be provided at least one of a liquid crystal element, optical path deflecting element and image displaying apparatus, which is/are different from the prior art cases.

BRIEF DESCRIPTION OF THE DRAWINGS

FIGS. 3A, 3B and 3C are diagrams modeling the arrangement of liquid crystal molecules in the chiral smectic C phase thereof.

EXPLANATION OF LETTERS OR NUMERALS

Figure 1:
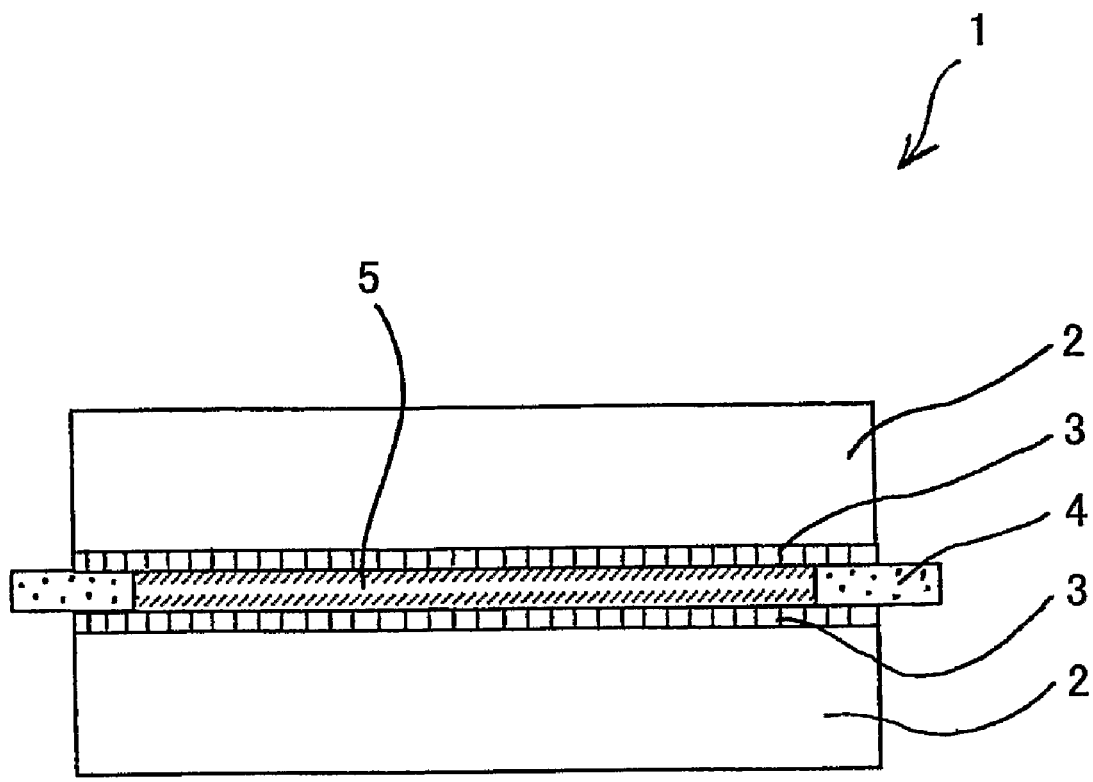
FIG. 1 is cross-section diagram showing the structure of a liquid crystal element according to an embodiment of the present invention.
Figure 2A:
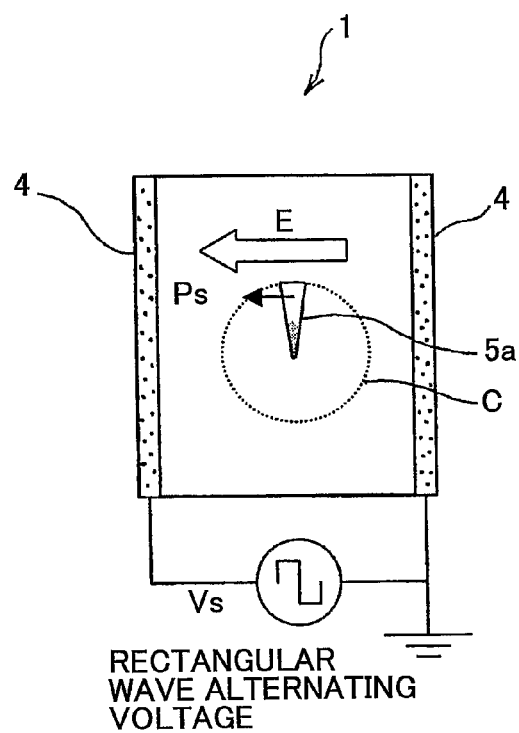
FIGS. 2A, 2B, 2C and 2D are schematic diagrams showing the direction of an electric field and the direction of tilt of liquid crystal molecules in the liquid crystal element in FIG. 1.
Figure 2C:
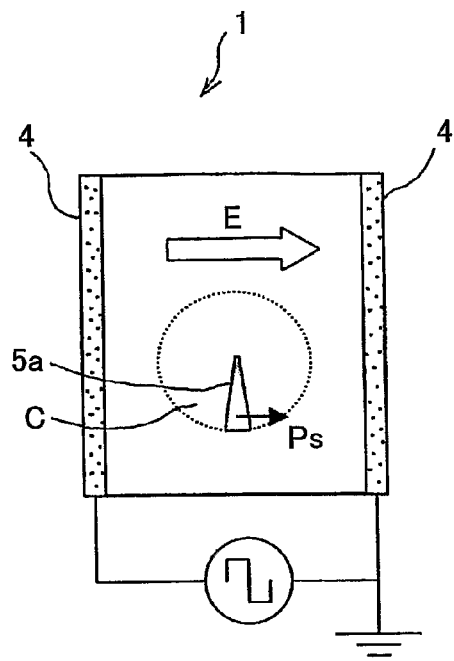
Figure 2B:
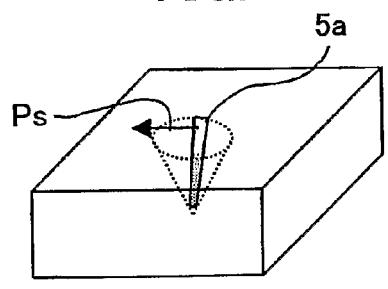
Figure 2D:
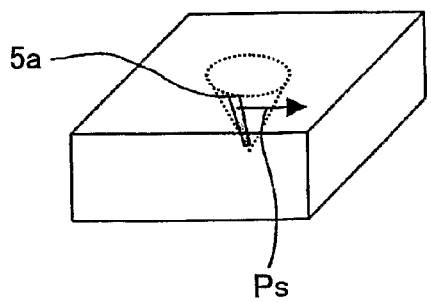

1: Liquid crystal element
2: Substrate
3: Vertical orientation film
4: Electrode
4L: Transparent line electrode
5: Liquid crystal layer
5a: Liquid crystal molecule
6: Dielectric layer
7: Spacer
8: Resistor
10: Liquid crystal element
20: Optical path deflecting element
21: Light source
22: Diffuser plate
23: Condenser lens
24: Transmission-type liquid crystal panel
25: Projection lens
26: Screen
27: Light source driving part
28: Driving part
30: Optical path deflecting element-driving part
41: Lamp
42: ND filter
43: Diffuser plate
44: F 1.4 50 mm lens
45: Polarization plate
46: MTF chart
47: Microcamera (CCD camera)
C: Ideal cone
E: Electric field
L0: Incident linearly polarized light
Ps: Spontaneous polarization

BEST MODE FOR CARRYING OUT THE INVENTION

A preferred embodiment(s) of the present invention is/are described with reference to the accompanying drawings, below.

First, a liquid crystal element according to an embodiment of the present invention is described based on FIG. 1.

FIG. 1 is a schematic cross section diagram showing a liquid crystal element. In the figure, numeral references 1, 2, 3, 4, and 5 refer to a liquid crystal element, a substrate, a vertical orientation films, an electrodes, and a layer of liquid crystal in a smectic C phase, respectively.

The liquid crystal element 1 according to the embodiment of the present invention is provided by arranging a pair of transparent substrates 2 opposite to each other. For the transparent substrate 2, for example, glass, quartz, and plastics may be used, and a transparent material with no birefringence is preferable. The thickness of the substrate 2 may be several dozen μm to several hundred μm for use.

The vertical orientation film 3 is formed on the inner face (faces facing each other) of the substrates 2. The material of the vertical orientation film 3 is not particularly limited so long as it orients a liquid crystal molecule in vertical orientation (homeotropic orientation) with respect to the surfaces of the substrates 2. For example, a vertical orientation agent for a liquid crystal display, a silane coupling agent, or a SiO or $SiO_2$ deposition film may be used. Herein, vertical orientation (homeotropic orientation) in the present application refers to not only the orientation of a liquid crystal molecule which is vertical to the surface of a substrate but also an orientation of tilt by up to several dozen degrees.

The space between both substrates 2 are regulated by a spacer, and the electrodes 4 and the liquid crystal layer 5 are formed between the substrates 2. For the spacer, for example, a sheet member having a thickness of approximately several μm to several mm or particles with a similar diameter, and is/are preferably provided outside the effective area of the element. For the electrodes 4, for example, a metal such as aluminum, copper and chromium, or a transparent electrode made of ITO (indium tin oxide) may be used. Also, it is preferable to use a metal sheet having a thickness similar to the thickness of the liquid crystal layer in order to apply a uniform horizontal electric field to the liquid crystal layer 5, which is provided outside the effective area of the element. As a more preferable example in FIG. 1, a metal sheet member is commonly used as a spacer member and the thickness of the liquid crystal layer is regulated by the thickness of the metal sheet member.

For the liquid crystal layer 5, a liquid crystal material may be used which can be provided by adding a chiral compound into a base liquid crystal material with a phase sequence of an isotropic liquid phase, a nematic phase, a smectic A phase and a smectic C phase from the side of higher temperature and can form a chiral smectic C phase within an operating temperature range. When a voltage is applied between the electrodes 4, the electric field is applied in a horizontal direction with respect to the liquid crystal layer.

Figure 5:
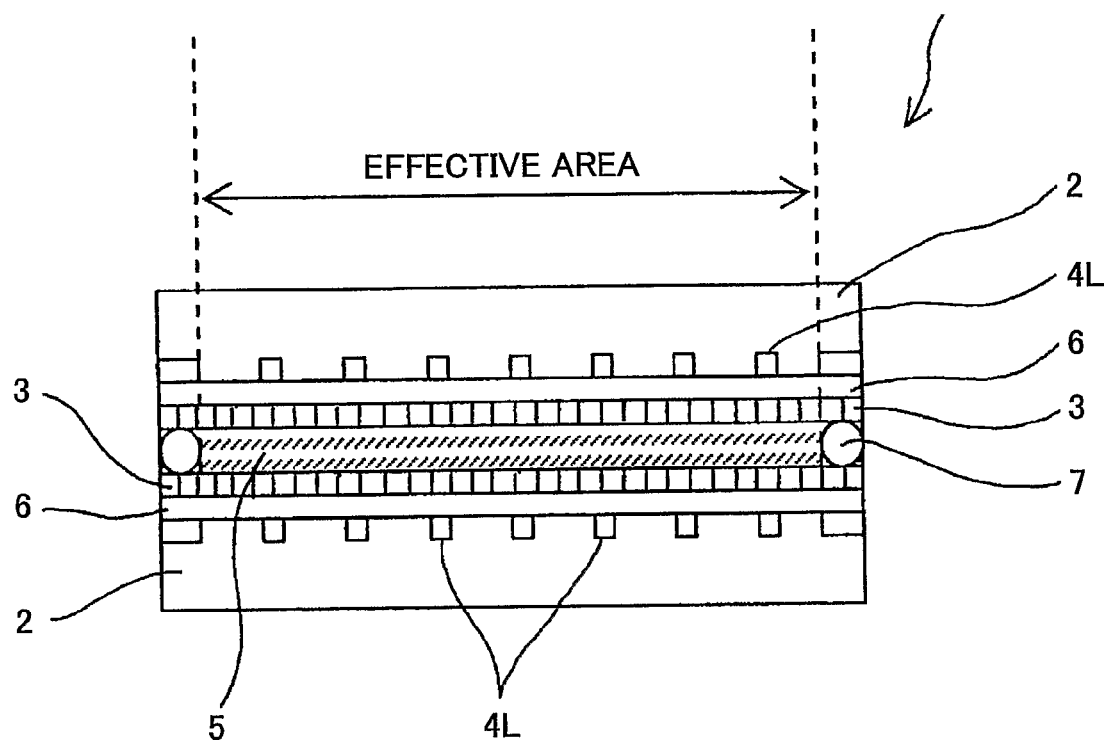
FIG. 5 is a cross section diagram showing another structure of a liquid crystal element according to an embodiment of the present invention.
Figure 6A:
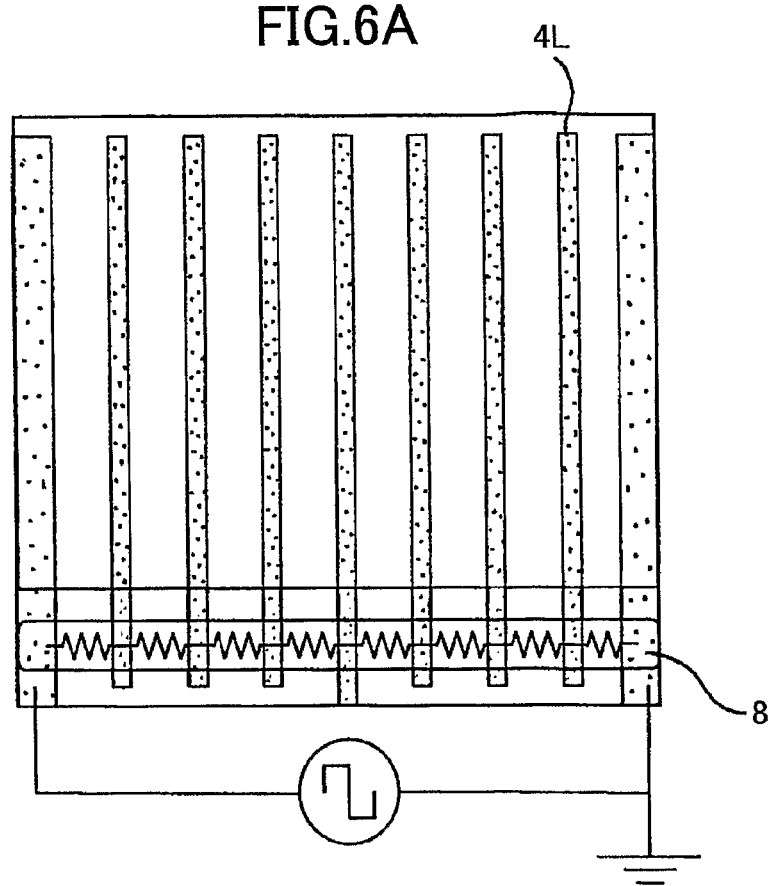
FIGS. 6A and 6B are diagrams showing the arrangement and connection of transparent line electrodes of the liquid crystal element in FIG. 5.
Figure 6B:
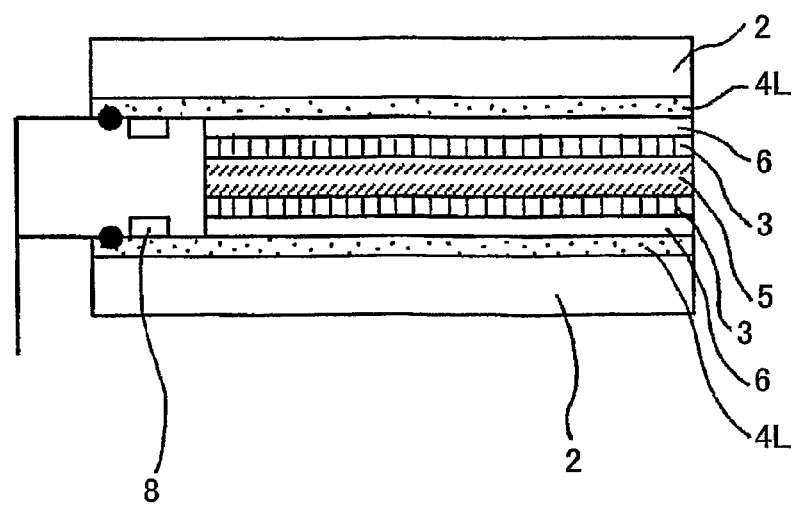

Also, a plurality of line-shaped and transparent electrodes 4L may be provided on a face of the substrates, as shown in FIGS. 5, 6A, and 6B, in order to apply a uniform and horizontal electric field over a larger area. Then, a sequentially changing voltage may be applied to the respective electrodes 4L so as to purposely generate an electric potential gradient in the horizontal directions and form a uniform and horizontal electric field. Furthermore, a transparent dielectric layer 6 may be provided between the substrate surface on which the line-shaped and transparent electrodes 4L are provided and the liquid crystal layer 5. As a method for applying the sequentially changing voltage to the respective transparent electrodes 4L, it is preferable to connect the respective transparent electrodes 4L in series via resistors 8. In the configuration shown in FIGS. 5, 6A, and 6B, the effective area of the liquid crystal element 10 may be increased up to a few centimeters square, which may be preferable for an application in which a relatively large surface area is required, such as an image displaying apparatus.

Next, the liquid crystal layer 5 which can form a chiral smectic C phase is described below.

Herein, a "smectic liquid crystal" is a liquid crystal layer which can be provided by aligning the directions of the major axis of a liquid crystal molecule such that a layer (as a smectic layer) is formed. Among such smectic liquid crystals, a liquid crystal in which the directions of normal of the layer (layer normal direction) correspond to the directions of the major axis of a liquid crystal molecule is referred to as a "smectic A phase", and liquid crystal in which the directions of the major axis of a liquid crystal molecule do not correspond to the directions of normal of the layer is referred to as a "smectic C phase". Generally, a ferroelectric liquid crystal in a smectic C phase thereof has a so-called spiral structure in which the directions of liquid crystal directors are spirally twisted for each smectic layer when no external electric field is applied and is referred to as a "chiral smectic C phase". On the other hand, in regard to an anti-ferroelectric liquid crystal in a chiral smectic C phase, the liquid crystal directors oppose to each other between adjacent layers. These liquid crystals in a chiral smectic C phase contain a chiral compound having an asymmetric carbon in its molecular structure which causes spontaneous polarization. Then, the optical characteristics thereof may be controlled by means of reorientation of the liquid crystal molecules in the directions determined by the spontaneous polarization Ps and the external electric field E. Additionally, although a ferroelectric liquid crystal is provided as an illustrative example of the liquid crystal layer in order to explain a liquid crystal element and an optical path deflecting element in this embodiment, etc., an anti-ferroelectric liquid may be used similarly.

Next, the principle of operation of a liquid crystal element according to an embodiment of the present invention is described with reference to FIGS. 2A-2D.

FIGS. 2A-2D are schematic diagrams illustrating the direction of an electric field and the direction of tilt of a liquid crystal molecule in the configuration shown in FIG. 1. Herein, the illustrated liquid crystal molecule 5a tilts such that a widely drawn end thereof is the upper side of the paper face and a narrowly drawn end thereof is the lower side of the paper face. Also, the spontaneous polarization (denoted by a symbol of Ps) of the liquid crystal is shown by an arrow. When the direction of the electric field is inverted, the direction of tilt of the liquid crystal molecule 5a which is oriented in a substantially vertical direction is inverted angularly. In the figure, the relationship between the direction of an applied electric field and the tilt direction of the liquid crystal molecule is illustrated in the case where the spontaneous polarization is positive. When the direction of the tilt is inverted angularly, it could be considered that rotational motion within an ideal conical plane as illustrated in the perspective views of FIGS. 2B and 2D would be made.

Herein, models of orientations of liquid crystal molecules in a chiral smectic C phase are shown in FIGS. 3A, 3B and 3C. A layer having a spiral structure is formed in which molecules having a tilt angle θ are stacked and shifted from each other in the rotation direction. When E=0, the liquid crystal directors may be spatially averaged by a bilaterally symmetric spiral structure, as shown in FIG. 3A. The average optic axis of the liquid crystal layer 5 is oriented in the normal direction of the layer, which are optically isotropic with respect to incident light which is parallel to the average optic axis. If a conoscopic image of such a liquid crystal layer in a chiral smectic C phase under no electric field is observed from the normal direction of the layer by using a polarization microscope, an image of cross may be positioned at the center portion and thus it may be confirmed that it has a uniaxial optic axis. Next, when a relatively low electrical field of 0<E<Es is applied in the horizontal directions of the liquid crystal layer, a rotational moment is provided to the liquid crystal molecule which is an action of the electric field E on the spontaneous polarization Ps. Thus, the spiral structure may be distorted to be asymmetric, as shown in FIG. 3B, and the average optic axis may be tilted to one direction. In this case, the distortion may be increased with the increase of the strength of the electric field, and in turn, the tilt angle of the average optic axis may be also increased. It may be confirmed by the movement of the image of cross in the conoscopic image. When the strength of the electric field is further increased to be equal to or greater than a certain threshold electric field Es, the spiral structure may disappear, as shown in FIG. 3C, and a uniform orientation may be provided. In this case, the tilt angle of the optic axis may be equal to the tilt angle θ of the liquid crystal director. Even when the electric field is further increased, the tilt angle θ may not be changed and the tilt angle of the optic axis may be constant.

Figure 4A:
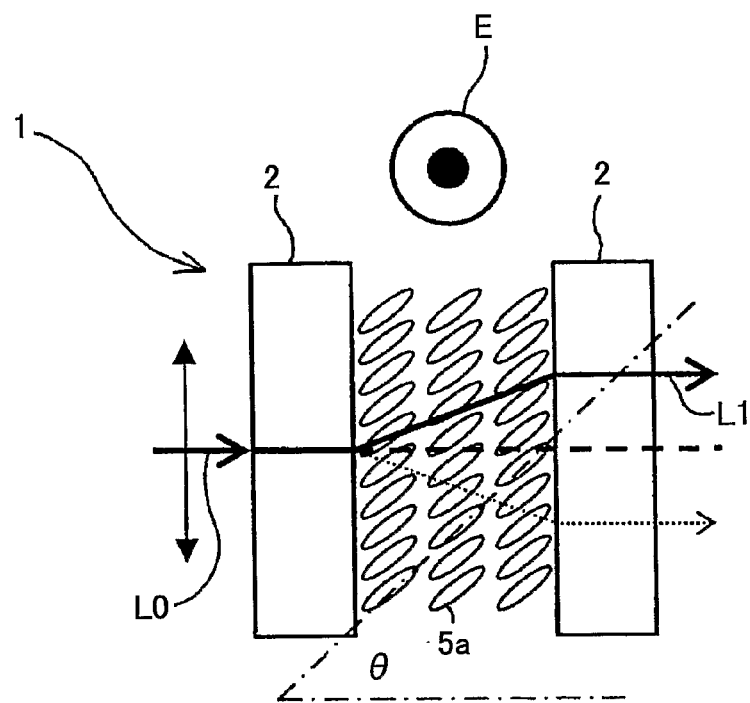
FIGS. 4A and 4B are schematic diagrams illustrating the principle of optical path deflection with the orientation of liquid crystal molecules.
Figure 4B:
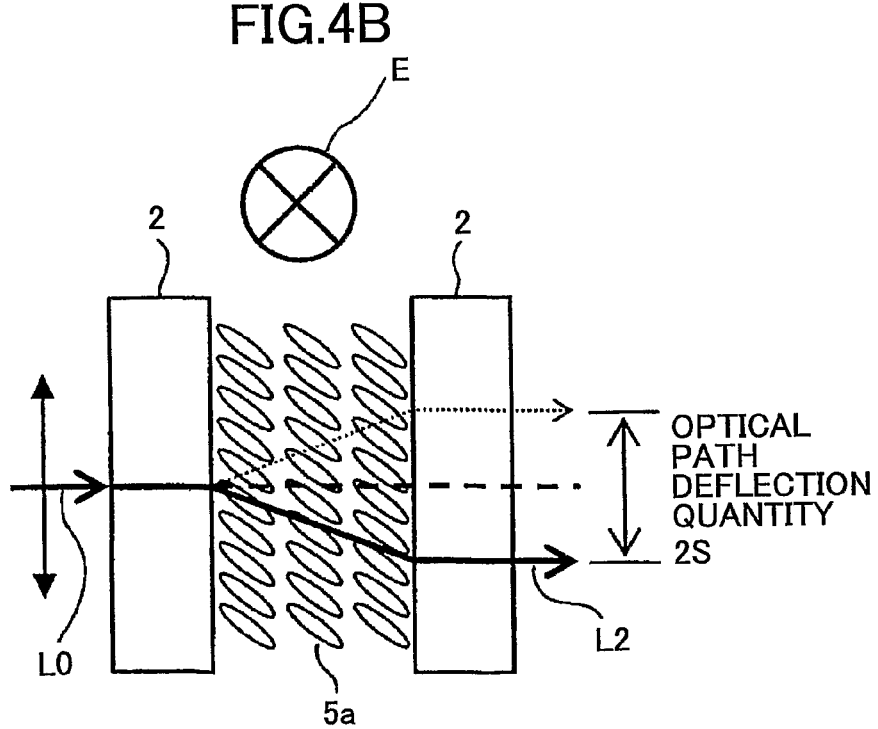

FIGS. 4A and 4B are schematic diagrams illustrating orientations of the liquid crystal molecules 5a in the liquid crystal element 1, in which the vertical orientation films 3, the spacers, and the electrodes 4 are omitted. For convenience, FIGS. 4A and 4B are drawn such that a voltage is applied in the front-back directions with respect to the paper face and the electric field E acts in the front-back directions of the paper face. The direction of the electric field may be switched by a power source which is not shown in the figures, depending on the direction of deflection of target light.

When an electric field is applied toward the front side of the paper face, as shown in FIG. 4A and if the spontaneous polarization of the liquid crystal molecules is positive, the number of molecules with liquid crystal directors tilted toward the upper right-hand side increases and the liquid crystal layer 5 may function as a birefringent plate with the average optic axis tilted toward the upper right-hand direction. In a case of the threshold electric field (referred to as a saturation electric field Es, hereinafter) for disintegrating the spiral structure for the chiral smectic C phase or greater, all the liquid crystal directors may have a tilt angle θ and the liquid crystal element 5a may function as a birefringent plate with an optic axis tilting upward at the angle θ. For example, linearly polarized light L0 incident from the left side of the liquid crystal element 5a in the figure as abnormal light may be parallel shifted upward in the figure. Herein, when the refractive index along the directions of the major axis of the liquid crystal molecule 5a, the refractive index along the direction of the minor axis thereof, and the thickness (gap) of the liquid crystal layer 5 are denoted by ne, no, and d, respectively, the parallel shift quantity S of an optical path may be represented the following Formula (1) (for example, see "Crystal Optics", Japan Society of Applied Physics, Optical Society of Japan, page 198):

$$S=[(1/no)^2-(1/ne)^2] \sin(2\theta) \times d \div [2((1/ne)^2 \sin^2\theta + (1/no)^2 \cos^2\theta)] \quad (1)$$

Similarly; when the voltage applied to the electrodes 4 is inverted so that the electric field E is applied toward the back side of the paper face as shown in FIG. 4B and if the spontaneous polarization of the liquid crystal molecule 5a is positive, the liquid crystal director tilts to the lower right-hand direction in the figure and the liquid crystal element 1 may function as a birefringent plate with an optic axis tilting downward at the angle θ. Similarly, linearly polarized light L0 incident from the left side of the liquid crystal element 1 in the figure as abnormal light may be parallel shifted downward in the figure. Thus, the optical path shift quantity of 2S may be obtained by inverting the direction of an electric field applied to the liquid crystal element 1. For example, when no=1.55, ne=1.70, d=30 μm, and θ=35° in formula (1), an optical path shift quantity of 2S=5 μm is obtained. Thus, in the case of a general chiral smectic liquid crystal, it may be required that the thickness of a liquid crystal layer be set to a very large one, namely, several dozen μm to several hundred μm in order to obtain an optical path shift quantity of approximately several μm to several dozen μm.

Also, in the liquid crystal layer 5 in a chiral smectic C phase with a homeotropic orientation used in an embodiment of the present invention, the action of a liquid crystal director may be less influenced by regulation power of the orientation film 3 and the directions of an optic axis may be easily controlled by adjusting the direction of an external electric field, as compared to a homogeneous orientation (in which the liquid crystal director is oriented parallel to a substrate face), whereby there may be an advantage such that a relatively low electric field is required. On the other hand, when the thickness of the liquid crystal layer 5 is increased, the orientation regulating power of the orientation film 3 on the substrate surface may be weaker at the center portion of the liquid crystal layer 5, and therefore, it may be difficult to maintain uniform orientation over throughout the liquid crystal layer 5. For example, the degree of the orientation may be easily lowered at the center portion of the liquid crystal layer 5 or white turbidity may be easily caused. In this situation, various combinations of chiral compounds added into a base liquid crystal material were investigated. As a result, a liquid crystal element which was excellent in vertical orientation, responsiveness and an optical characteristic even when the thickness of the liquid crystal layer 5 was sufficiently large could be obtained for an embodiment of the present invention.

Liquid crystal elements according to specific embodiments of the present invention are described below.

Specific Embodiment 1-1

First, specific embodiment 1-1 is characterized by containing at least, a chiral compound of general formula (1-I)

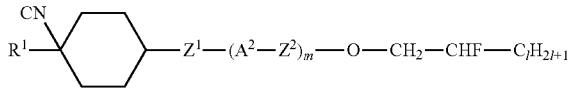

(1-I)

In formula (1-I), $R^1$ is an alkyl group or alkenyl group whose carbon number is any of 1 to 15, one carbon of which may be substituted with —CN or at least one H of which may be replaced by F or Cl. Also, a $CH_2$ group thereof may be replaced by —O—, —CO—, —O—CO—, —CO—O— or —O—CO—O—. Also, $A^2$ is 1,4-phenylene group, pyridine-2,5-diyl, pyrimidine-2,5-diyl, 1,3,4-thiadiazole-2,5-diyl, or 1,2,4-thiadiazole-3,5-diyl, one or two hydrogen atoms of which may be replaced by F. Each of $Z^1$ and $Z^2$ is independently —CO—O—, —O—CO—, or a single bond. Also, m=1 or 2 and $1 \leq l \leq 9$.

Also, it is preferable that the chiral compound of general formula (1-I) be a compound of the following formula (1-II)

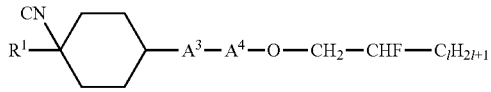

(1-II)

In formula (1-II), each of $A^3$ and $A^4$ is independently selected from a 1,4-phenylene group, pyridine-2,5-diyl and pyrimidine-2,5-diyl, one or two hydrogen atoms of which may be replaced by F. Also, in the formula, $R^2$ is an alkyl group or alkenyl group whose carbon number is any of 1 to 15 and $1 \leq l \leq 9$.

Also, as a base liquid crystal, it is preferable to use, for example, a phenylpyrimidine compound, which is considered to have a lower viscosity due to the skeleton thereof and provide high speed response, which can provide a crystal phase sequence of an isotropic liquid phase, a nematic phase, a smectic A phase and a smectic C phase from a higher temperature side, and particularly, which may provide a smectic C phase which is stable at or near room temperature.

Although the reason has not been fully understood, the spiral pitch of a chiral smectic C phase may be appropriate so as to stabilize the orientation thereof, and accordingly, a liquid crystal layer may be obtained which does not have defective orientation but has a good orientation even for a liquid crystal element with a thick layer of vertically oriented liquid crystal.

Specific Embodiment 1-2

Specific embodiment 1-2 is characterized in that the chiral compound of formula (1-II) is a compound of the following formula (1-III),

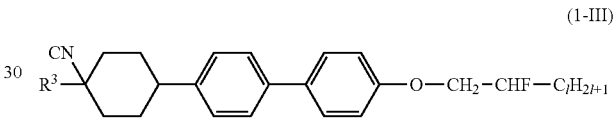

(1-III)

in specific embodiment (1-1).

In formula (1-III), $R^3$ is an alkyl group or alkenyl group whose carbon number is any of 1 to 15 and $1 \leq l \leq 9$. Although the reason has not been fully understood, the spiral pitch of a chiral smectic C phase may be appropriate so as to stabilize the orientation thereof, and accordingly, a liquid crystal layer may be obtained which does not have defective orientation but has a very good orientation even for a liquid crystal element with a thick layer of vertically oriented liquid crystal.

Specific Embodiment 1-3

Specific embodiment (1-3) is specific embodiment (1-1) or specific embodiment (1-2) in which a base liquid crystal material contains at least one-kind of compound having a phenylpyrimidine skeleton.

A phenylpyrimidine compound can provide a crystal phase sequence of an isotropic liquid phase, a nematic phase, a smectic A phase and a smectic C phase from a higher temperature side, and particularly, which may provide a smectic C phase which is stable at or near room temperature. Accordingly, a liquid crystal element may be provided which can form a stable ferroelectric liquid crystal layer in an operating temperature range.

Herein, as a preferable example of a compound having a phenylpyrimidine skeleton, there may be provided a compound of the following formula (1-a)

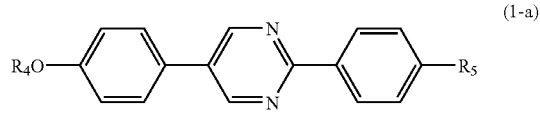

(1-a)

-continued

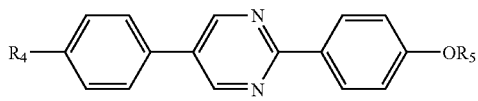
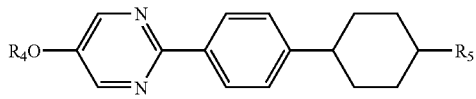
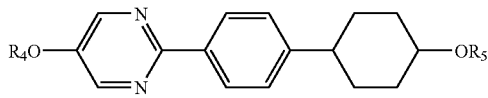
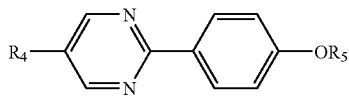

and the following (1-b)

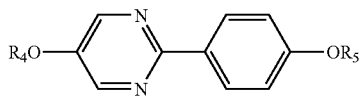
(1-b)

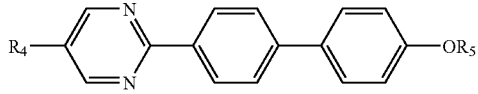
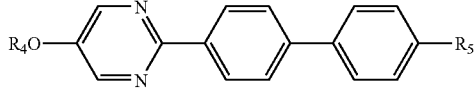
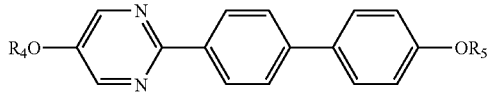
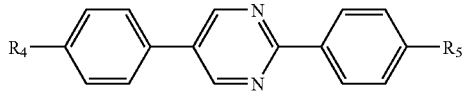
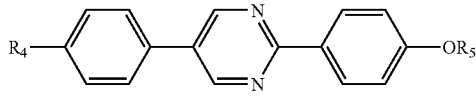

In formulas (1-a) and (1-b), each of $R_4$ and $R_5$ is a linear or branched alkyl or alkenyl group whose carbon number is any of 3 to 15, at least one H of which may be replaced by F or Cl. Also, a $CH_2$ group thereof may be replaced by —O—, —CO—, —O—CO—, —CO—O—, or —O—CO—O—.

Specific Embodiment 2-1

First, Specific embodiment (2-1) is characterized by containing, at least, a chiral compound of the following general formula (2-I)

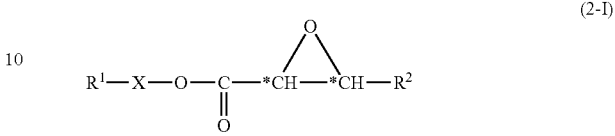
(2-I)

and a chiral compound of the following general formula (2-II)

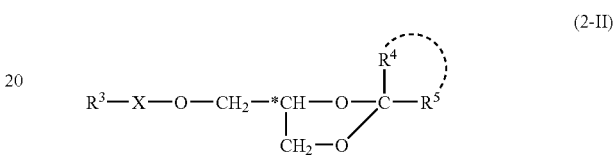
(2-II)

In formula (2-I), an X group is $-(A^1)_h\text{-}(B^1)_i\text{-}(A^2)_j\text{-}(B^2)_k\text{-}(A^3)_l$-, $R^1$ represents a linear alkyl group or alkoxy group whose carbon number is any of 3 to 12, and $R^2$ represents a linear alkyl group whose carbon number is any of 3 to 12. Additionally, * in the formula represents a chiral center. Also, each of h and j is 0, 1 or 2, each of i and k is 0 or 1, l is 0, 1 or 2, wherein i is 0 when both or one of h and j is 0, k is 0 when l is 0, and h+j+l is 2 or 3. Particularly, it is preferable that the carbon number of $R^2$ be any of 3 to 5.

Also, in the formula, each of $A^1$ and $A^2$ represents a group selected from formulas (2-a)

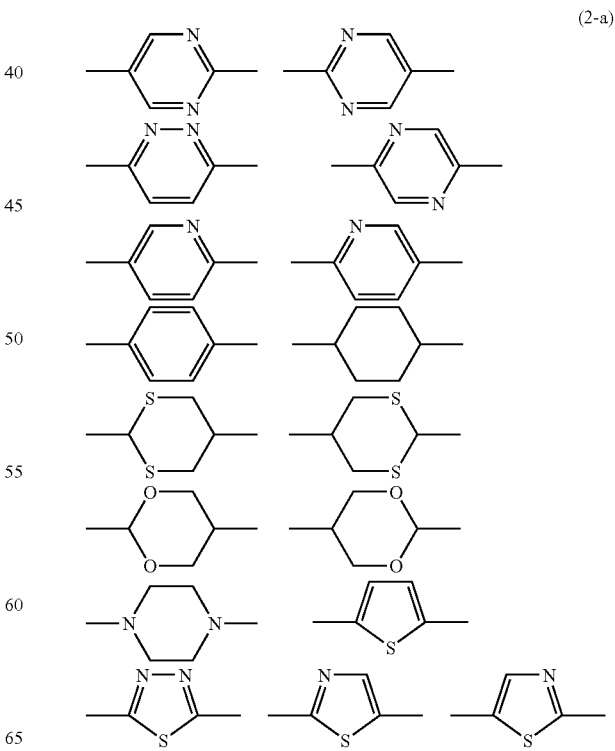
(2-a)

and $A^3$ represents a group selected from formulas (2-b)

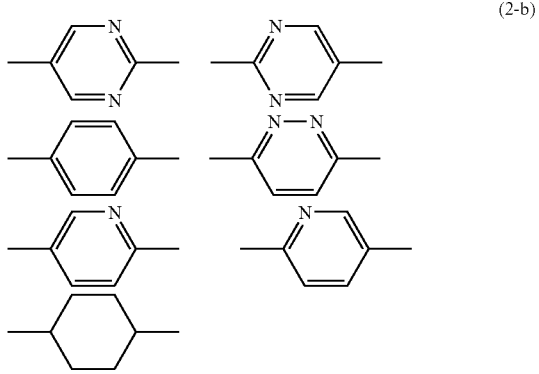

Also, each of $B^1$ and $B^2$ is —CO—O—, —O—CO—, —CH$_2$O— or —OCH$_2$—.

In formula (2-II), an X group is -(A$^1$)$_h$-(B$^1$)$_i$-(A$^2$)$_j$-(B$^2$)$_k$-(A$^3$)$_l$-, each of $A^1$, $A^2$, $A^3$, $B^1$, $B^2$, h, i, j, k and l is defined identically to that of formula (2-I) and may be independently identical to or different from that of formula (2-I), $R^3$ represents a linear alkyl group or alkoxy group whose carbon number is any of 3 to 12, each of $R^4$ and $R^5$ represents a linear alkyl group whose carbon number is any of 3 to 5 or an alkyl group which has a six or more-membered ring structure and whose ends bond to each other. Particularly, it is preferable that one of $A^1$, $A^2$ and $A^3$ be a pyrimidine ring and both i and k are 0.

Also, as a base liquid crystal, it is preferable to use, for example, a phenylpyrimidine compound, which is considered to have a lower viscosity due to the skeleton thereof and provide high speed response, which can provide a crystal phase sequence of an isotropic liquid phase, a nematic phase, a smectic A phase and a smectic C phase from a higher temperature side, and particularly, which may provide a smectic C phase which is stable at or near room temperature.

An epoxide ester group has an R configuration around the chiral canter thereof and a cis configuration. It has properties of inducing a plus spontaneous polarization and inducing a right-handed spiral in a nematic (N*) phase. Since a trans configuration with a similar structure has an effect of inducing relatively small spontaneous polarization, the cis configuration with a larger effect is more preferable.

On the other hand, a dioxolane ether group in formula (2-II) has an S configuration around the chiral center thereof and a trans configuration. It has properties of inducing a plus spontaneous polarization and inducing a left-handed spiral in a nematic (N*) phase. That is, the compound of formula (2-II) may have an effect of canceling the effect of the compound of formula (2-I) which may provides the spiral. Also, since the signs of the spontaneous polarizations are identical, the spiral pitch in a nematic (N*) phase may be controlled from a small value to a large value by appropriately adjusting the content ratio of the compound of formula (2-II) and compound of formula (2-I) while the large spontaneous polarizations are maintained.

Since it is considered that the spiral pitch in a nematic (N*) phase may influence the orientation at the time of manufacturing a liquid crystal element, a liquid crystal element which is excellent in the orientation may be certainly obtained by setting the optimum pitch for the characteristics of each element. Also, the spiral pitch in a chiral smectic C phase may be controlled by combining the compound of formula (2-II) and the compound of formula (2-I). When the spiral pitch in a chiral smectic C phase is small, it may be difficult to generate a domain structure in a liquid crystal layer when the driving operation of a liquid crystal element is stopped, but the strength of an electric field for saturating the tilt angle of an optic axis tends to increase. On the other hand, when the spiral pitch in a chiral smectic C phase is large, the strength of an electric field for saturating the tilt angle of an optic axis tends to decrease, but a domain structure may be easily generated in a liquid crystal layer when the driving operation of a liquid crystal element is stopped.

In regard to a liquid crystal element according to an embodiment of the present invention, it is preferable that the spiral pitch in a chiral smectic C phase be smaller than the thickness of a liquid crystal layer in order to maintain the stability of the orientation. When the optimum pitch is set for the characteristics of each element, a liquid crystal layer may be obtained which is excellent in the stability of the orientation and has a relatively weak-strength electric field for saturating the tilt angle of an optic axis, and a sufficient tilt angle of the optic axis may be obtained even under lower electric field conditions.

Specific Embodiment 2-2

Specific embodiment 2-2 is a liquid crystal element of specific embodiment (2-1) in which a chiral compound of the following general formula (2-III)

    (2-III)

has been further added into the liquid crystal layer.

In formula (2-III), an X group is -(A$^1$)$_h$-(B$^1$)$_i$-(A$^2$)$_j$-(B$^2$)$_k$-(A$^3$)$_l$-, a Y group is

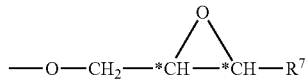

each of $A^1$, $A^2$, $A^3$, $B^1$, $B^2$, h, i, j, k and l is defined identically to that of formula (2-I) and may be independently identical to or different from that of formula (2-I) or formula (2-II), $R^6$ is a linear alkyl group or alkoxy group whose carbon number is any of 3 to 12 or the Y group, and $R^7$ represents a linear alkyl group whose carbon number is any of 3 to 12. Particularly, it is preferable that the carbon number of $R^7$ be any of 3 to 5.

An epoxide ester group represented by the Y group in formula (2-III) has an S configuration around the chiral canter thereof and a trans configuration. It has properties of inducing a plus spontaneous polarization and inducing a left-handed spiral in a nematic (N*) phase. Therefore, there may be provided an effect of controlling the spiral pitch, particularly, in a nematic (N*) phase, in combination with the compound of formula (2-I). In regard to the configuration, the effect of inducing spontaneous polarization may be relatively small. However, the spiral pitch in a nematic (N*) phase may be adjusted with a small amount of change in another physical property by combining an ester-type compound with a cis configuration as represented by formula (2-I) and an ether-type compound with a trans configuration as represented by formula (2-III). When the chiral compound of formula (2-III) is further added into the chiral compounds of formulas (2-I) and formula (2-II), a liquid crystal element may be obtained which has a large spontaneous polarization and is excellent in the responsiveness and the orientation.

Specific Embodiment 2-3

Specific embodiment 2-3 is a liquid crystal element of specific embodiment (2-2) in which the chiral compound of general formula (2-I) is a compound of the following formula (2-IV)

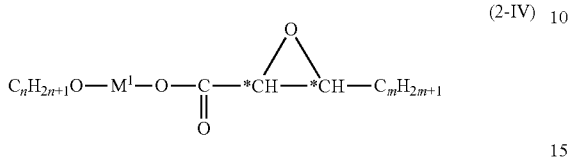
(2-IV)

the chiral compound of general formula (2-II) is a compound of the following formula (2-V)

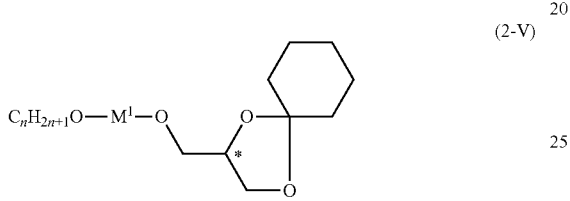
(2-V)

and the chiral compound of general formula (2-III) is a compound of the following formula (2-VI)

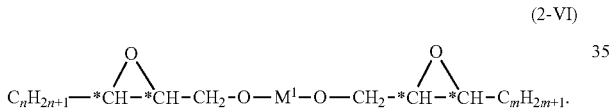
(2-VI)

In formula (2-IV), each of n and m is an integer of 3 to 12, wherein n and m may be identical numerical values. Also, in formula (2-V), n is an integer of 3 to 12. Furthermore, in formula (2-VI), each of n and m is an integer of 3 to 12. n and m may be identical numerical values. Additionally, n and m in any of formula (2-IV) to formula (2-VI) may be numerical values independent of each other. Also, in formulas (2-IV), (2-V) and (2-VI), $M^1$ is a mesogenic and aromatic unit (mesogenic group) and represents a group selected from formulas (2-c)

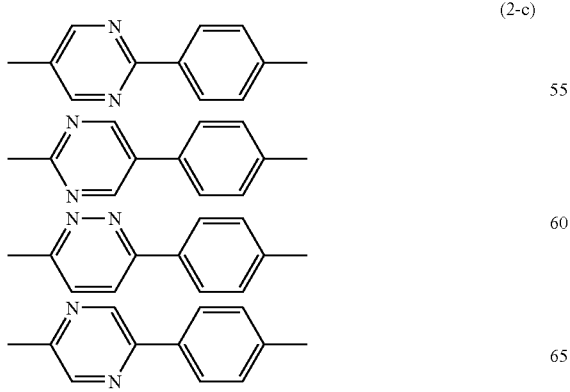
(2-c)

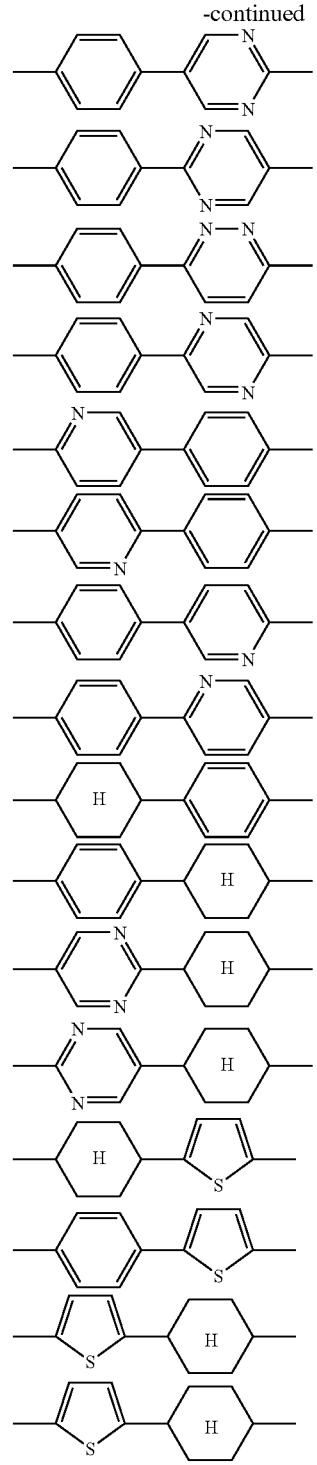

When a phenylpyrimidine group is used as a mesogenic group in formula (2-IV), particularly, when one having the same direction as that of a pyrimidine ring of a base liquid crystal material is used, it is considered that the compatibility may be comparatively improved and there may be provided an effect of improving the stability of a liquid crystal layer such as the prevention of crystallization. Also, a feature of formula (2-V) is that the terminal of the chiral portion is a cyclohexane structure. Although the relation to the molecular structure has not fully been understood, there may be provided an effect of improving and maintaining the vertical orientation by using the compound of formula (2-V). Furthermore, since the compound of formula (2-VI) has two chiral centers, there may be provided an effect of inducing large spontaneous polarization. Therefore, the spontaneous polarization may be further increased and a liquid crystal element which is very excellent in responsiveness may be obtained.

Specific Embodiment 2-4

Specific embodiment 2-4 is a liquid crystal element of specific embodiment 2-3 in which a compound of the following formula (2-VII)

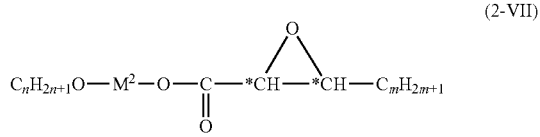

(2-VII)

has been further added as another chiral compound of general formula (2-I).

In formula (2-VII), each of n and m is an integer of 3 to 12. n and m may be identical numerical values. Also, $M^2$ is a mesogenic and aromatic unit (mesogenic group) and represents a group selected from the following formulas (2-d)

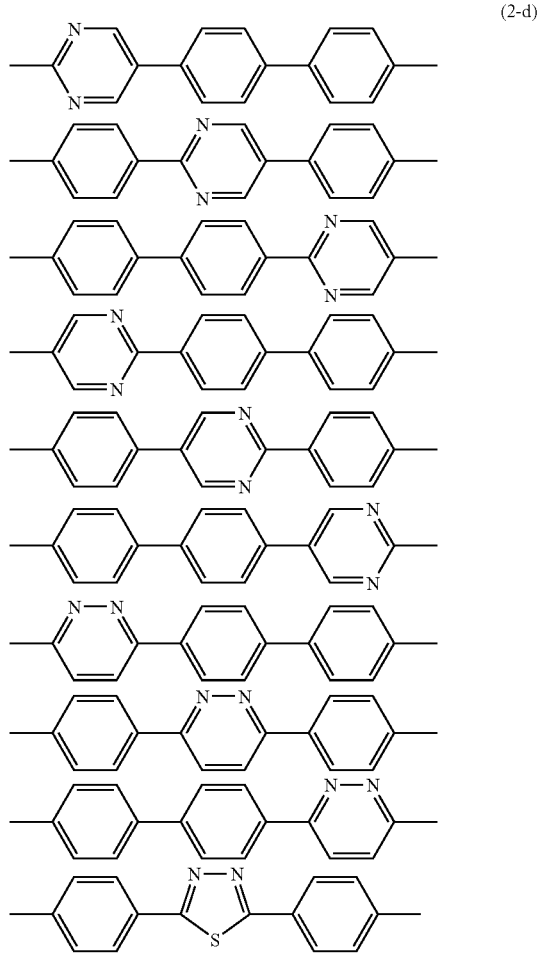

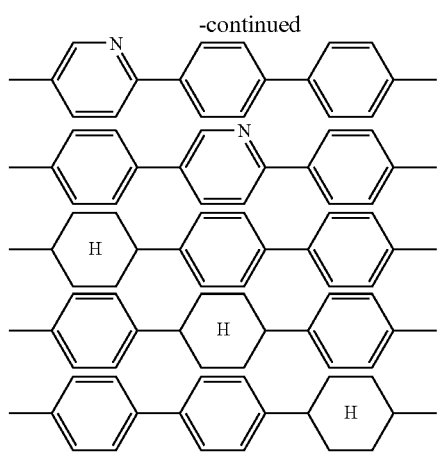

The mesogenic group in formula (2-VII) has a tricyclic structure and generally tends to have an effect of improving phase transition temperature by addition thereof. In the specific embodiment of the present invention, when a 2,5-phenylpyrimidine group is particularly used as a mesogenic group in formula (2-VII), there may be provided a significant effect of decreasing the saturation electric field. Although the cause thereof has not fully been understood, it may be considered to be a specific effect of interaction with another chiral compound. Accordingly, a liquid crystal element may be provided which has a very weak-strength electric field for saturating the tilt angle of an optic axis and is very excellent in responsiveness.

Specific Embodiment 2-5

Specific embodiment 2-5 is a liquid crystal element of specific embodiment 2-2 in which the chiral compound of general formula (2-I) is the compound of formula (2-IV) and the chiral compound of general formula (2-II) is the compound of formula (2-V), as similar to specific embodiment 2-3, characterized in that the chiral compound of general formula (2-III) is a compound of the following formula (2-VIII)

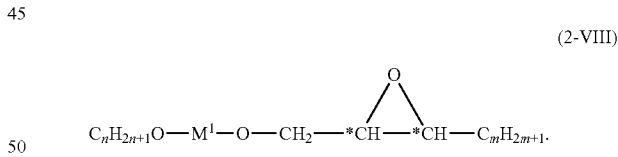

(2-VIII)

In formula (2-VIII), each of n and m is an integer of 3 to 12. n and m may be identical numerical values. Additionally, n and m in any of formula (2-IV) to formula (2-VIII) may be numerical values independent of each other. $M^1$ is an mesogenic group, for which the same mesogenic group as described above may be used.

As formula (2-VIII) is compared to formula (2-VI) described above, they are different in that the former has one chiral center part. Accordingly, the effect of inducing spontaneous polarization is relatively small. However, when a phenylpyrimidine group is particularly used as a mesogenic group in formula (2-VIII), the compatibility may be good one and there may be provided an effect of improving the orientation because of a structure similar to another chiral compound or a base liquid crystal material. Particularly, there may be provided an effect of improving an MTF (Modulation Transfer Function) characteristic as an optical property during an operation of a liquid crystal element.

Specific Embodiment 2-6

Specific embodiment 2-6 is a liquid crystal element of specific embodiment 2-5 in which the compound of formula (2-VII) has been further added as another chiral compound of general formula (2-I).

In formula (2-VII), each of n and m is an integer of 3 to 12. n and m may be identical numerical values. $M^2$ is a mesogenic group, for which those described above may be used.

The mesogenic group in formula (2-VII) has a tricyclic structure and generally tends to have an effect of improving phase transition temperature by addition thereof. In the specific embodiment of the present invention, when a 2,5-phenylpyrimidine group is particularly used as a mesogenic group in formula (2-VII), there may be provided a significant effect of improving the vertical orientation and responsiveness. Although the cause of improving the orientation has not fully been understood, it is considered that the responsiveness may be significantly improved due to the effect of increasing the spontaneous polarization. However, it was observed that saturation electric field tends to increase, contrary to the effect of specific embodiment (2-4). Although the cause thereof has not fully been understood, it is considered that a different effect may be provided even if the identical compound is added, since the interaction with another chiral compound may be effective. Accordingly, a liquid crystal element may be provided which has a good vertical orientation, very short response time, and a very excellent MTF characteristic at the time of electric field driving.

Specific Embodiment 2-7

Specific embodiment 2-7 is a liquid crystal element of any of specific embodiment 2-1 to specific embodiment 2-6 in which the ratio of the chiral compound contained in a liquid crystal layer is equal to or greater than 15% by weight and equal to or less than 40% by weight.

If the ratio of the chiral compound as described above is less than 15% by weight, in other words, the content of a base liquid crystal is equal to or greater than 85% by weight, the spontaneous polarization may be small and the response time may be degraded to 1.0 ms or greater. If the response time is longer than 1.0 ms, no feature of a ferroelectric liquid crystal may be utilized. Therefore, the ratio of a chiral compound is equal to or greater than 15% by weight, in other words, the rate of a base liquid crystal is less than 85% by weight, the spontaneous polarization may be greater than approximately 40 $nC/cm^2$, and the response time of a liquid crystal element may be equal to or less than 1.0 ms, which means a high speed. However, if a chiral compound is increased too much for speeding up, a side effect such as phase separation and white turbidity caused by crystallization may be generated. Therefore, when the ration of a chiral compound is equal to or less than 40% by weight, the degradation of the optical characteristic of a liquid crystal element, such as the generation of white turbidity, may be prevented.

Also, more preferably, the ratio of a chiral compound contained in a liquid crystal layer is equal to or greater than 20% by weight and equal to or less than 40% by weight. When the ratio of a chiral compound is equal to or greater than 20% by weight, the spontaneous polarization may be further increases and the response time of a liquid crystal element may be equal to or less than 0.5 ms, which means a high speed.

Specific Embodiment 2-8

Specific embodiment (2-8) is a liquid crystal element of any of specific embodiment 2-1 to specific embodiment 2-7, in which the base liquid crystal material contains at least a phenylpyrimidine compound.

A phenylpyrimidine compound may provide a crystal phase sequence of an isotropic liquid phase, a nematic phase, a smectic A phase and a smectic C phase from a higher temperature side, and particularly, which may provide a smectic C phase at or near room temperature. Accordingly, a liquid crystal element which can form a stable ferroelectric liquid crystal layer in an operating temperature range may be provided.

Herein, as a preferable example of a compound having a phenylpyrimidine skeleton, there may be provided compounds of the following formula (2-e)

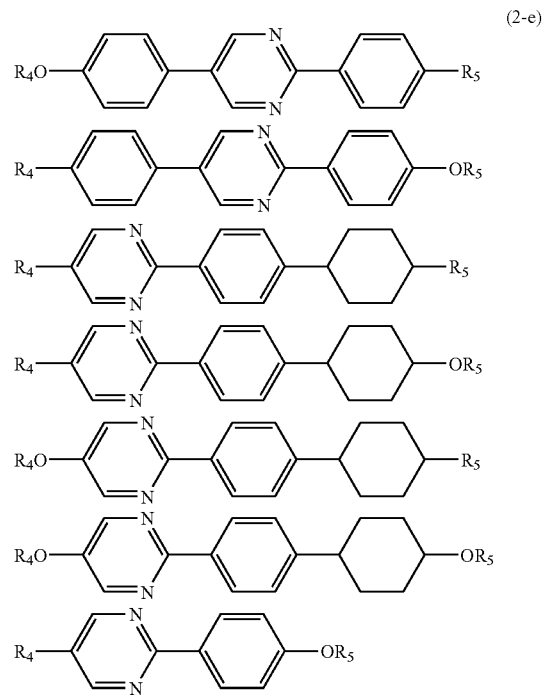

and the following formula (2-f)

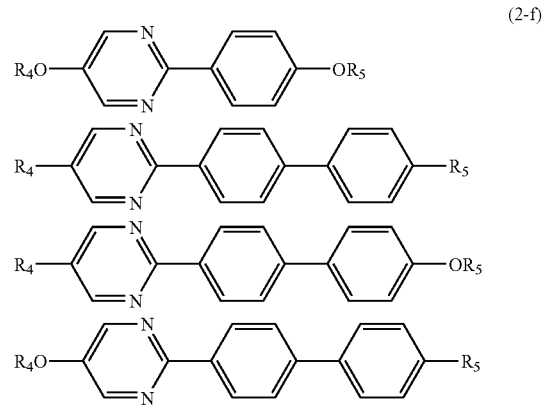

-continued

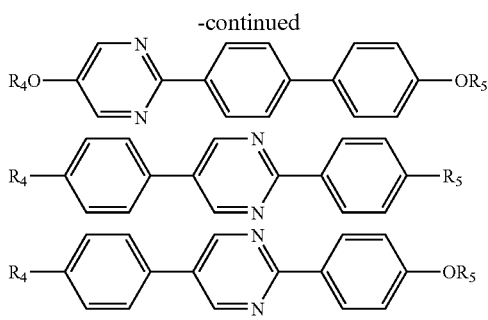

In formula (2-e), each of $R_4$ and $R_5$ is a linear or branched alkyl or alkenyl group whose carbon number is any of 3 to 15, at least one H of which may be replaced by F or Cl. Also, a $CH_2$ group thereof may be replaced by —O—, —CO—, —O—CO—, —CO—O—, or —O—CO—O—.

An optical path deflecting element according to an embodiment of the preset invention deflects the optical path of light in response to an electric signal, characterized by including a liquid crystal element of any of specific embodiment (1-1) to specific embodiment (1-3) and specific embodiment (2-1) to specific embodiment (2-8), making light incident on the liquid crystal element be linearly polarized light, and setting a polarization plane of the linearly polarized light to be in directions orthogonal to a direction of an applied parallel electric field in the element, whereby a relative position of an optical path of exit light with respect to an optical path of incident light can be parallel shifted. That is, the path of transmitted light can be parallel shifted with an operation of inverting the direction of tilt or tilt angle of the optic axis of the liquid crystal layer 5. Since a ferroelectric liquid crystal material is used as shown in FIGS. 4A and 4B, the operation of inverting the optic axis may be fast, and therefore, high speed shift of the optical path may be attained.

Next, an image displaying apparatus according to an embodiment of the present invention is described.

An image displaying apparatus according to an embodiment of the present invention includes an image displaying element in which plural picture elements capable of controlling light according to image information are two-dimensionally arrayed, a light source, an illumination device which illuminates the image displaying element, an optical device for observing an image pattern displayed on the image displaying element, a display driving device which forms an image field based on plural sub-fields provided by temporally dividing it, and the above-mentioned optical path deflecting element according to an embodiment of the present invention which deflects the optical path of light which exits from each picture element, wherein the number of picture elements of the image displaying element is apparently increased by displaying on the image displaying element an image pattern corresponding to a display which is positionally shifted in accordance with the deflection of an optical path for each sub-field which is provided by the optical path deflecting element, thereby conducting display.

Figure 7:
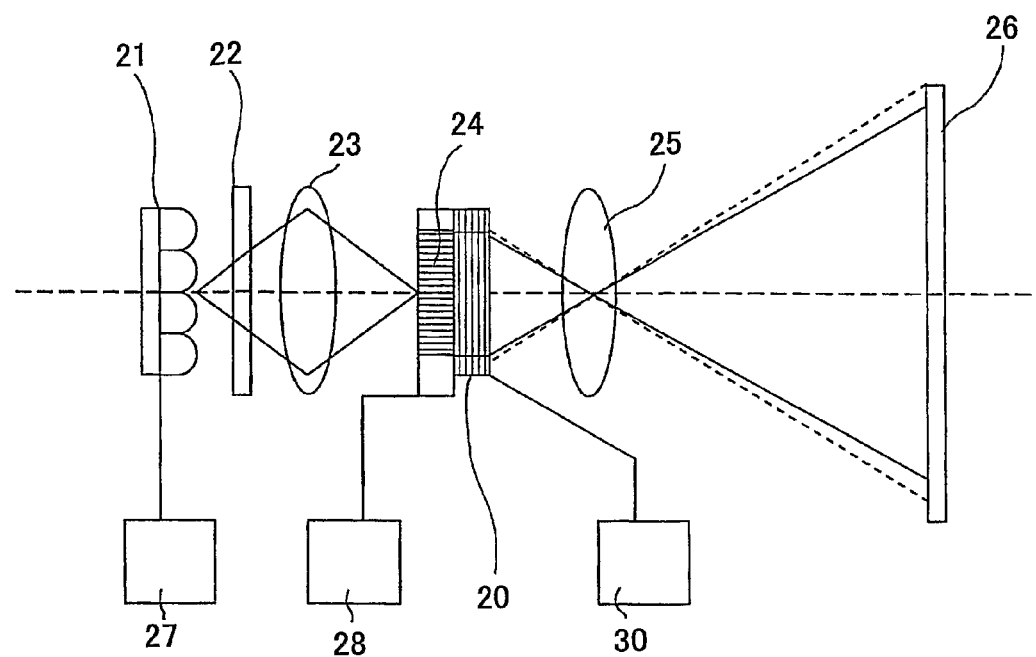
FIG. 7 is a schematic diagram showing the structure of an image displaying apparatus according to an embodiment of the present invention.

An example of the configuration of an image displaying apparatus is shown in FIG. 7. In FIG. 7, there are provided a light source 22 in which LED lamps are arranged in two-dimensional array, and a diffuser plate 22, a condenser lens 23, a transmission-type liquid crystal panel 24 as an image displaying element, and a projection lens 25 as an optical member for observing an image pattern, along the traveling direction of light generated from the light source 21 to a screen 26, in order. Also, a light source driving part for the light source 21 and a driving part for the transmission-type liquid crystal panel 24 are denoted by reference numerals 27 and 28, respectively.

Also, an optical path deflecting element 20 which functions as a pixel shift element is intermediately provided along the optical path between the transmission-type liquid crystal panel 24 and the projection lens 25 and is connected to a driving part 30. For such an optical path deflecting element 20, a liquid crystal element as described above may be used.

Illumination light emitted from the light source 21 which is controlled by the optical source driving part 27 is changed to uniform illumination light through the diffuser plate 22, which is controlled by the liquid crystal driving part 28 in synchronization with the illumination source and illuminates the transmission-type liquid crystal panel 24 through the condenser lens 23. The illumination light which has been subjected to spatial light modulation through the transmission-type liquid crystal panel 24 is incident on the optical path deflecting element 20 as image light and the image light is shifted by an arbitrary distance in directions of arraying the picture elements by using the optical path deflecting element 20. The light transmitted through the optical path deflecting element 20 is magnified and projected on the screen 26 by the projection lens 25.

Herein, an image pattern corresponding to a display which is positionally shifted in accordance with the position of a shifted optical path for each of plural sub-fields which are provided by temporally dividing an image field is displayed so that the number of picture elements of the transmission-type liquid crystal panel 24 is apparently increased. Thus, the shift quantity in the optical path deflecting element 20 may be set to ½ of the pitch of the picture elements since the number of projected images may be increased at twice in directions of arraying the picture elements of the transmission-type liquid crystal panel 24. Then, when an image signal for driving the transmission-type liquid crystal panel 24 is corrected according to and by the shift quantity, an apparently highly fine image may be displayed. Herein, since the optical path deflecting element which has a good orientation and is excellent in high speed responsiveness is used, high speed deflection of an optical path may be attained for a sub-field image, and thereby, an apparently highly fine image may be displayed. Also, the switching time of the sub-field images may be shortened due to the high speed responsiveness, and therefore, the temporal efficiency of light utilization may be improved.

PRACTICAL EXAMPLES

Examples of practically implementing the present invention (examples 1-1 and 1-2) are described below.

Practical Example 1-1

(1) Manufacture of Liquid Crystal Element
A liquid crystal element was manufactured in accordance with the following steps.

First, 400 transparent electrode lines with a width of 10 μm were parallel formed at a pitch of 100 μm on the surface of a glass substrate with a thickness of 1.1 mm. The effective length of the transparent electrode line was 10 mm. The effective surface area of the transparent electrode line group was 40 mm square and a glass plate with a thickness of 150 μm was laminated thereon by using an Ultraviolet-ray-curing adhesive. The thickness of the adhesive layer was approximately 10 μm. Thus, the transparent line electrodes 4L were embedded inside the transparent glass plate, as a liquid crystal element in the cross-section diagram of FIG. 5, which was used as substrates 2.

A vertical (homeotropic) orientation film 3 with a thickness of 0.06 μm which was made of a polyimide compound was formed on the surface of the substrate. In regard to the polyimide orientation film, a solution of a polyamic acid was applied by spin-coating and heating treatment at approximately 180° C. as imidation treatment was conducted so as to obtain a polyimide film. Subsequently, the two substrates were opposed by sandwiching a spacer sheet of 50 μm outside the effective surface area so as to obtain a cell. Then, the substrates were laminated to each other such that the transparent electrode lines on the effective surface area of the upper substrate were alternately positioned with respect to those of the lower substrate when viewing from the top of the cell. Then, while the cell was being heated at approximately 95° C., a liquid crystal material described below was injected into space between the substrates by means of capillary action. After cooling, sealing was made with an adhesive, so as to obtain a liquid crystal element 10 with a liquid crystal thickness of 70 μm and an effective surface area of 4 cm square.

Additionally, a resistor 8 was film-formed by CrSiO film deposition such that each transparent electrode line 4L was directly connected to the substrate 2, as shown in FIGS. 6A and 6B. When a power supply composed of a pulse generator and a high speed AMP is connected to both terminals of the resistor 8, electric current flows through the array of resistors and a certain voltage is distributed accordingly, so that a certain distribution of electric potential is made inside the effective surface area.

(2) Liquid Crystal Material

The following compounds were mixed and used as a liquid crystal material in the practical example.

Base liquid crystals mixed at component ratios shown in the following Table 1-1: 90 wt %

TABLE 1-1

| | |
|---|---|
| 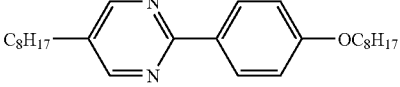 | 10 wt % |
| 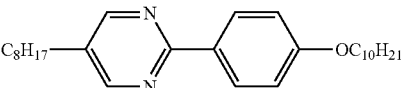 | 8 wt % |
| 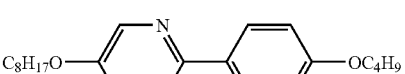 | 6 wt % |
|  | 10 wt % |
| 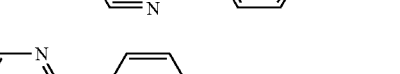 | 7 wt % |
| 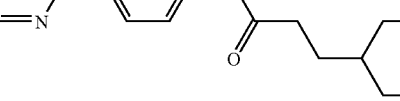 | 9 wt % |
|  | 6 wt % |
| 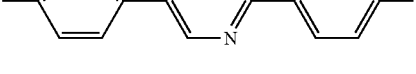 | 3 wt % |
| 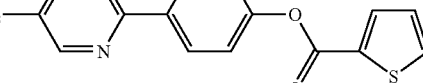 | 7 wt % |

TABLE 1-1-continued

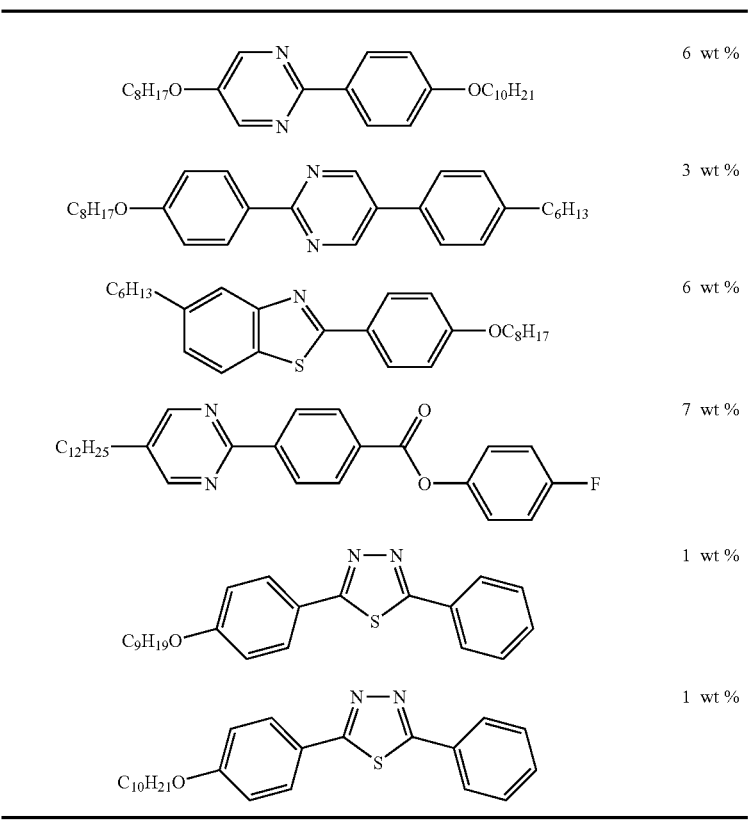

| | |
|---|---|
| | 6 wt % |
| | 3 wt % |
| | 6 wt % |
| | 7 wt % |
| | 1 wt % |
| | 1 wt % |

Compound A shown in the following formula as an example of a chiral compound of formula (1-I): 10 wt %

Compound A

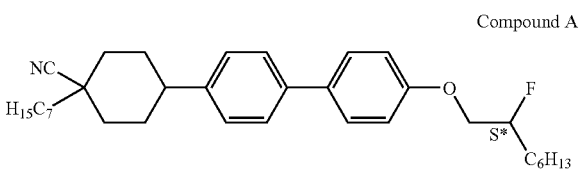

Additionally, the phase transition temperatures of the liquid crystal material were −15° C. for crystal/smectic C phase, 81° C. for a chiral smectic C phase/a smectic A phase, 89° C. for the smectic A phase/a nematic phase, and 101-103° C. for the nematic phase/an isotropic phase. Also, the result of the spontaneous polarization thereof which was measured by using an SSFLC element was −24 nC/cm².

(3) Evaluation of Characteristics of Liquid Crystal Element

After the sample of liquid crystal element was manufactured, the vertical orientation thereof was evaluated at the initial condition by means of target observation and polarization microscope observation. As a result, the transmittance thereof was good and no or a few domain was observed so that widely uniform orientation was exhibited.

Figure 8:
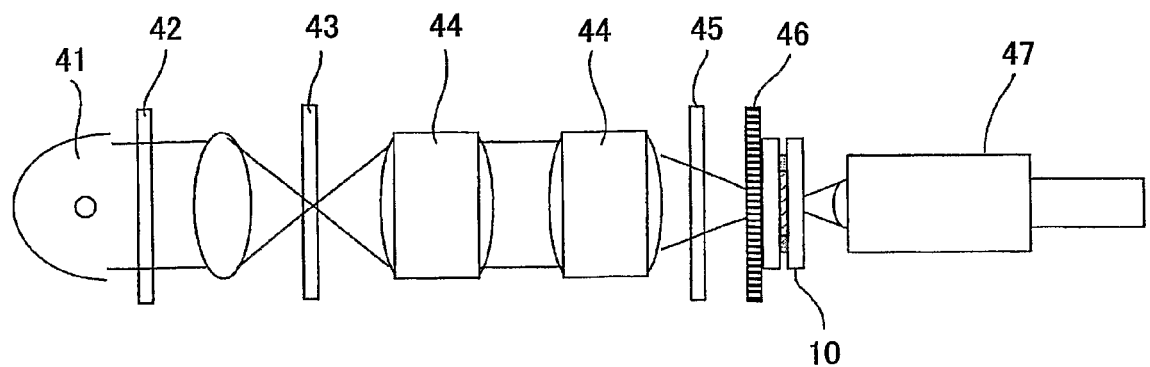
FIG. 8 is a schematic diagram showing the structure of a device for evaluating the characteristics of a liquid crystal element.

Next, various kinds of characteristics of the liquid crystal element were measured by using a device shown in FIG. 8.

An MTF chart 46 having a sine wave density distribution of a spatial frequency of 100 cycles/mm (pitch: 10 μm) was illuminated with light from a light source 41 through an optical system for setting the illumination angle (an ND filter 42, a diffuser plate 43, an F 4.1 50 mm lens 44) and a polarizing plate 45. Then, light passing though the liquid crystal element 10 was observed by a camera 47 such as a high speed camera equipped with a microscope and a highly fine CCD camera which light had been transmitted through the MTF chart 46.

At this time, a rectangular wave alternating current voltage with a frequency for driving the liquid crystal element 10 was applied which was set to 100 Hz. Accordingly, an optical path shifting was made by switching the optic axis of the liquid crystal layer 5 and the shift of the position of the pattern of the MTF chart 46 (MTF pattern) was observed. The shift of the pattern was imaged on the high speed camera 47 and then the obtained image was analyzed so as to obtain the response time. Herein, the time period required for shifting from 10% of the maximum shift quantity to 90% thereof was defined as a response time, and comparison was made at electric field strength of 150 V/mm.

Also, if a highly fine CCD camera were used instead of the high speed camera, relatively slow movement of the MTF pattern should be observed in an obtained image on the CCD camera due to the difference between the frame frequency of the CCD camera and the driving frequency of the liquid crystal element 10. In this case, an image of the MTF pattern which had been shifted toward one side and was at rest was installed in a computer and the MTF value of the liquid crystal element was obtained. Also, an MTF ratio relating to the part of liquid crystal layer 5 was obtained by normalizing the obtained MTF value with an MTF value obtained for a reference element.

Furthermore, the optical path shift quantity was obtained by comparing the static portions of both sides of the MTF pattern. The strength of an electric field was further increased and the strength of an electric field for saturating the tilt of the optic axis was obtained from electric filed at which the optical path shift quantity was saturated at a certain value.

The results of evaluation with respect to the liquid crystal element of the practical example are shown below.

Response time: 1.3 ms (at electric field E=150 V/mm)
Saturation electric field: 270 V
MTF ratio: 0.883 (when driving at 100 Hz)

The orientation of the liquid crystal of the practical example was very good and the MTF value was 0.883 which was high. Although the response time was 1.3 ms, which meant relatively slow, and the saturation electric field was 270 V, which was relatively large, it had a practical performance as a vertical orientation ferroelectric liquid crystal element.

Practical Example 1-2

An image displaying apparatus as shown in FIG. 7 was manufactured while the liquid crystal element of practical example 1-1 was used as an optical path deflecting element. For an image displaying element (transmission-type liquid crystal panel 24), a polysilicon TFT liquid crystal light valve with a width across corner of 0.9 inch and an XGA (1024×768 dots) was used. Herein, the pitch of picture elements was approximately 18 μm along each of the longitudinal and lateral directions and the numerical aperture of the picture element was approximately 50%. Also, a micro-lens array was provided at the light source side of the image displaying element (transmission-type liquid crystal panel 24) in order to improve the light collection rate in regard to illumination light. In the practical example, LED light sources of RGB colors were used as a light source and a so-called field sequential method was employed which performed a color display by switching the colors of light for illuminating one liquid crystal panel 24 described above at high speed.

In the practical example, the frame frequency for displaying an image was 60 Hz and the sub-field frequency for apparently increasing the number of picture elements at 4 times as many as them by means of pixel shifting was 240 Hz which was 4 times as many as the frame frequency. Also, in order to further divide one sub-frame into 3 frames for the colors, images corresponding to respective colors were switched at 720 Hz. An observer could view a full color image by switching on and off the LED light sources corresponding to respective colors in accordance with the timing of displaying respective color images on the liquid crystal panel.

In the practical example, two liquid crystal element of practical example 1-1 were used as a optical path deflecting element 20 in which the first optical path deflecting element and the second optical path deflecting element were provided at the entrance side and the exit side, respectively. They were arranged such that the directions of line electrodes of them were orthogonal to each other and corresponded to the directions of arraying the picture elements of the image displaying element (transmission-type liquid crystal panel 24).

Also, in the practical example, exit light from the liquid crystal light valve had been linearly polarized light and the light valve was arranged such that the direction of polarization corresponded to the direction of optical path deflection of the first optical path deflecting element. In addition, a linearly-polarizing plate as polarization direction controlling means was provided at the entrance side of the optical path deflecting element 20 in order to ensure the degree of polarization of light incident on the optical path deflecting element. Thus, the generation of noisy light which was not deflected by the first optical path deflecting element but went straight may be prevented.

Furthermore, a polarization plane rotation element was provided between the first and second optical path deflecting elements. The polarization plane rotation element was manufactured as follows. That is, a polyimide-type orientation material was spin-coated on a thin glass substrate (3 cm×4 cm, thickness: 0.15 mm) so as to form an orientation film with a thickness of approximately 0.1 μm. After annealing treatment of the glass substrate, rubbing treatment was conducted. A spacer with a thickness of 8 μm was sandwiched between the two glass substrates at marginal portions thereof. Then, the upper and lower substrates were laminated to each other such that the rubbing directions of them were orthogonal to each other, so as to obtain an empty cell. A material provided by mixing an appropriate amount of a chiral material into a nematic liquid crystal with a positive dielectric anisotropy was injected into the cell under an ordinary pressure so as to obtain a TN liquid crystal cell as a polarization plane rotation element in which the orientations of liquid crystal molecules were twisted by 90 degrees. Since no electrode was provided on the cell, it functioned as a simple polarization plane rotation element.

In regard to the arrangement of the polarization plane rotation element, it was arranged to be sandwiched between the two optical path deflecting elements such that the polarization plane of light exiting from the first optical path deflecting element corresponded to the rubbing direction of the entrance face of the polarization plane rotation element. The polarization plane of light exiting from the first optical path deflecting element was rotated by 90 degrees and corresponded to the polarization direction of the second optical path deflecting element, due to the polarization plane rotation element. Thus manufactured pixel shift element composed of the first optical path deflecting element, the polarization plane rotation element, and the second optical path deflecting element was located just behind the image displaying element (transmission-type liquid crystal panel 24).

In the practical example, a rectangular wave voltage for driving the pixel shift element was ±6 keV and the frequency thereof was 60 Hz. Also, the timing of driving was set such that phases along the longitudinal and lateral directions of each of the two elements were shifted by 90 degrees and 4 directional image shifting was attained. Under the conditions, the shift quantity of the optical path deflecting element was 6 μm.

In the practical example, when a sub-field image which should be displayed on the image displaying element was recreated under a condition of 240 Hz, a highly fine image could be displayed in which the number of the picture elements along the two directions, namely, both the longitudinal directions and lateral directions, was apparently increased 4 times as many as the number of the picture elements. The switching time of the optical path deflecting element was approximately 1.3 ms and a sufficient efficiency of light utilization was obtained. Also, for example, no flicker was observed.

Examples of practically implementing the present invention (examples 2-1 and 2-8) are described below.

Additionally, in the practical example, a chiral compound added and used as a liquid crystal material was selected from compounds of the following Table 2-1.

TABLE 2-1

Compound A
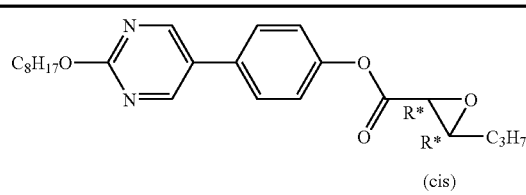

Compound B
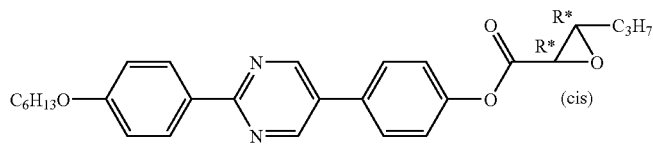

Compound C
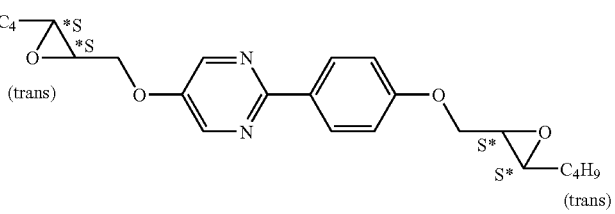

Compound E
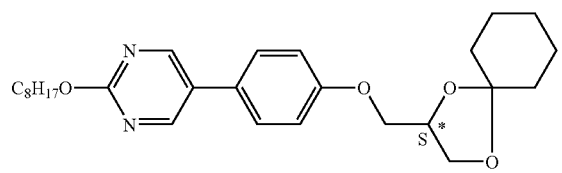

Compound H
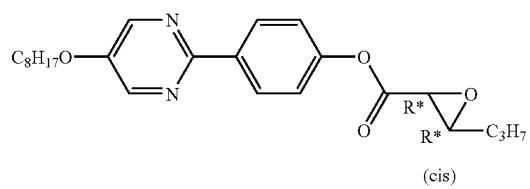

Compound I
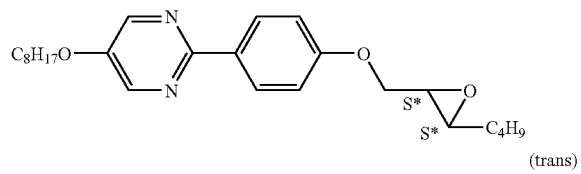

Practical Example 2-1

(1) Manufacture of Liquid Crystal Element

A liquid crystal element was manufactured in accordance with the following steps.

First, 400 transparent electrode lines with a width of 10 μm were parallel formed at a pitch of 100 μm on the surface of a glass substrate with a thickness of 1.1 mm. The effective length of the transparent electrode line was 10 mm. The effective surface area of the transparent electrode line group was 40 mm square and a glass plate with a thickness of 150 μm was laminated thereon by using an Ultraviolet-ray-curing adhesive. The thickness of the adhesive layer was approximately 10 μm. Thus, the transparent line electrodes 4L were embedded inside the transparent glass plate, as a liquid crystal element in the cross-section diagram of FIG. 5, which was used as substrates 2.

A vertical (homeotropic) orientation film 3 with a thickness of 0.06 μm which was made of a polyimide compound was formed on the surface of the substrate. In regard to the polyimide orientation film, a solution of a polyamic acid was applied by spin-coating and heating treatment at approximately 180° C. as imidation treatment was conducted so as to obtain a polyimide film. Subsequently, the two substrates were opposed by sandwiching a spacer sheet of 50 μm outside the effective surface area so as to obtain a cell. Then, the substrates were laminated to each other such that the transparent electrode lines on the effective surface area of the upper substrate were alternately positioned with respect to those of the lower substrate when viewing from the top of the cell. Then, while the cell was being heated at approximately 95° C., a liquid crystal material described below was injected into space between the substrates by means of capillary action. After cooling, sealing was made with an adhesive, so as to obtain a liquid crystal element 10 with a liquid crystal thickness of 70 μm and an effective surface area of 4 cm square.

Additionally, a resistor 8 was film-formed by CrSiO film deposition such that each transparent electrode line 4L was directly connected to the substrate 2, as shown in FIGS. 6A and 6B. When a power supply composed of a pulse generator and a high speed AMP is connected to both terminals of the resistor 8, electric current flows through the array of resistors and a certain voltage is distributed accordingly, so that a certain distribution of electric potential is made inside the effective surface area.

(2) Liquid Crystal Material

The following compounds were mixed and used as a liquid crystal material in the practical example.

Base liquid crystals mixed at component ratios shown in the following Table 2-2: 87 wt %

TABLE 2-2

| | |
|---|---|
| 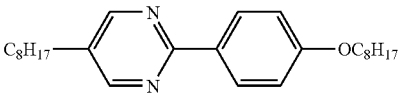 | 10 wt % |
| 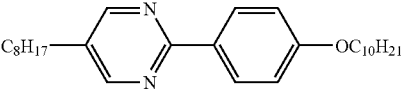 | 8 wt % |
| 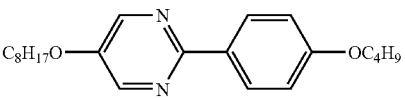 | 6 wt % |
| 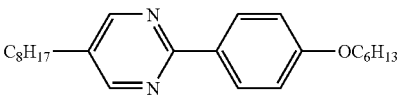 | 10 wt % |
| 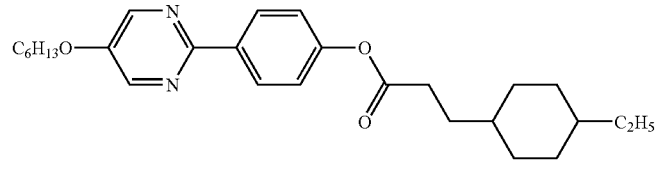 | 8 wt % |
| 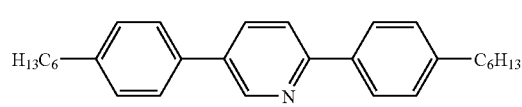 | 10 wt % |
| 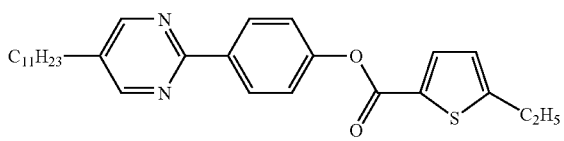 | 6 wt % |
| 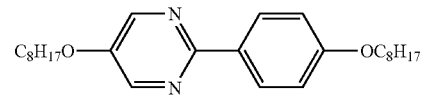 | 4 wt % |
| 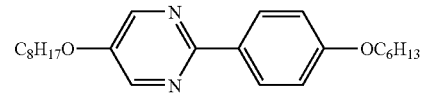 | 8 wt % |
| 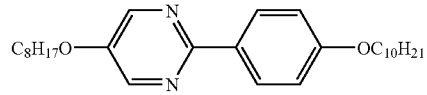 | 6 wt % |
| 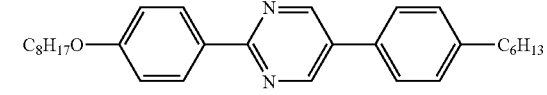 | 4 wt % |

TABLE 2-2-continued

| Structure | Amount |
|---|---|
| C6H13-benzothiazole-phenyl-OC8H17 | 8 wt % |
| C12H25-pyrimidine-phenyl-C(O)O-phenyl-F | 8 wt % |
| C9H19O-phenyl-thiadiazole-phenyl | 2 wt % |
| C10H21O-phenyl-thiadiazole-phenyl | 2 wt % |

Compound A shown in Table 2-1 as an example of a chiral compound of formula (2-I): 4 wt %
Compound B shown in Table 2-1 as an example of a chiral compound of formula (2-I): 5 wt %
Compound E shown in Table 2-1 as an example of a chiral compound of formula (2-II): 4 wt %

Additionally, the phase transition temperatures of the liquid crystal material were −17° C. for crystal/smectic C phase, 75° C. for a chiral smectic C phase/a smectic A phase, 85° C. for the smectic A phase/a nematic phase, and 90° C. for the nematic phase/an isotropic phase. Also, the result of the spontaneous polarization thereof which was measured by using an SSFLC element was +35 nC/cm².

(3) Evaluation of Characteristics of Liquid Crystal Element

After the sample of liquid crystal element was manufactured, the vertical orientation thereof was evaluated at the initial condition by means of target observation and polarization microscope observation. The evaluation was conducted in manner of ranking evaluation and the evaluation criteria were as follows.

The orientation of the liquid crystal element in the practical example belonged to rank 2 and was allowed for practical use.

(Evaluation Criteria for Orientation)

Rank 1: A defective orientation so as to transmit no light was found.
Rank 2: The transmittance is good but slight white turbidity was found. The white turbidity could be disappeared by electric field driving and therefore it could be practically used.
Rank 3: The transmittance was good and no white turbidity was found. However, a domain with a size of several dozen μm to several hundred μm was observed.
Rank 4: The transmittance was good and no or little domain was observed. Widely uniform orientation was observed.

Next, various kinds of characteristics of the liquid crystal element were measured by using a device shown in FIG. 8.

An MTF chart 46 having a sine wave density distribution of a spatial frequency of 100 cycles/mm (pitch: 10 μm) was illuminated with light from a light source 41 through an optical system for setting the illumination angle (an ND filter 42, a diffuser plate 43, an F 4.1 50 mm lens 44) and a polarizing plate 45. Then, light passing though the liquid crystal element 10 was observed by a camera 47 such as a high speed camera equipped with a microscope and a highly fine CCD camera which light had been transmitted through the MTF chart 46.

At this time, a rectangular wave alternating current voltage with a frequency for driving the liquid crystal element 10 was applied which was set to 100 Hz. Accordingly, an optical path shifting was made by switching the optic axis of the liquid crystal layer 5 and the shift of the position of the pattern of the MTF chart 46 (MTF pattern) was observed. The shift of the pattern was imaged on the high speed camera 47 and then the obtained image was analyzed so as to obtain the response time. Herein, the time period required for shifting from 10% of the maximum shift quantity to 90% thereof was defined as a response time, and comparison was made at electric field strength of 150 V/mm.

Also, if a highly fine CCD camera was used instead of the high speed camera, relatively slow movement of the MTF pattern should be observed in an obtained image on the CCD camera due to the difference between the frame frequency of the CCD camera and the driving frequency of the liquid crystal element 10. In this case, an image of the MTF pattern which had been shifted toward one side and was at rest was installed in a computer and the MTF value of the liquid crystal element was obtained. Also, an MTF ratio relating to the part of liquid crystal layer 5 was obtained by normalizing the obtained MTF value with an MTF value obtained for a reference element.

Furthermore, the optical path shift quantity was obtained by comparing the static portions of both sides of the MTF pattern. The strength of an electric field was further increased and the strength of an electric field for saturating the tilt of the optic axis was obtained from electric filed at which the optical path shift quantity was saturated at a certain value.

The results of evaluation with respect to the liquid crystal element of the practical example are shown below.

Response time: 1.2 ms (at electric field E=150 V/mm)
Saturation electric field: 45 V
MTF ratio: 0.6 (when driving at 100 Hz)

The liquid crystal of the practical example was excellent in that the saturation electric field was 45 V, which was low. Although the orientation characteristic belonged to rank 2, which was slightly low, and the response time was 1.2 ms, which meant relatively slow, it had a practical performance as a vertical orientation ferroelectric liquid crystal element.

Practical Example 2-2

A liquid crystal element was manufactured by a method similar to that of practical example 2-1, except that the following composition was used instead of a liquid crystal material in practical example 2-1.
Base liquid crystals with component ratios shown in Table 2-2: 82 wt %
Compound A shown in Table 2-1 as an example of a chiral compound of formula (2-I): 5 wt %
Compound B shown in Table 2-1 as an example of a chiral compound of formula (2-I): 5 wt %
Compound E shown in Table 2-1 as an example of a chiral compound of formula (2-II): 3 wt %
Compound C shown in Table 2-1 as an example of a chiral compound of formula (2-III): 5 wt %
Additionally, the phase transition temperatures of the liquid crystal material were −17° C. for crystal/smectic C phase, 77° C. for a chiral smectic C phase/a smectic A phase, 87° C. for the smectic A phase/a nematic phase, and 93° C. for the nematic phase/an isotropic phase. Also, the result of the spontaneous polarization thereof which was measured by using an SSFLC element was +60 nC/cm².

Also, the orientation of the liquid crystal element in the practical example belonged to rank 3, which was relatively good.

Furthermore, the results of evaluation for the characteristics of the liquid crystal element were as follows.
Response time (VAFLC element): 0.6 ms (at electric field E=150 V/mm)
Saturation electric field (VAFLC element): 40 V
MTF ratio (VAFLC element): 0.85 (when driving at 100 Hz)

In regard to the liquid crystal element of practical example 2-2, the saturation electric field was 40 V, which was small, and further, the response time was improved to 0.6 ms.

Comparison Example

A liquid crystal element was manufactured by a method similar to that of practical example 2-1, except that the following composition was used instead of a liquid crystal material in practical example 2-1.
Base liquid crystals with component ratios shown in Table 2-2: 82 wt %
Compound A shown in Table 2-1 as an example of a chiral compound of formula (2-I): 6 wt %
Compound B shown in Table 2-1 as an example of a chiral compound of formula (2-I): 6 wt %
No chiral compound of formula (2-II) is contained.
Compound C shown in Table 2-1 as an example of a chiral compound of formula (2-III): 6 wt %
Additionally, the phase transition temperatures of the liquid crystal material were −17° C. for crystal/smectic C phase, 80° C. for a chiral smectic C phase/a smectic A phase, 86° C. for the smectic A phase/a nematic phase, and 93° C. for the nematic phase/an isotropic phase. Also, the result of the spontaneous polarization thereof which was measured by using an SSFLC element was +77 nC/cm².

Also, the orientation of the liquid crystal element in the comparison example was determined to be rank 1 since white turbidity caused by defective orientation was generated at a portion of the effective part. It is considered that the reason is that no compound of formula (2-II) was contained, and therefore, the vertical orientation was degraded. Since good orientation was found for an SSFLC element for measuring spontaneous polarization, it is considered that this phenomenon was a specific phenomenon for an element with vertical orientation and a relatively large cell thickness. None of other evaluations was performed since the white turbidity was generated.

Practical Example 2-3

A liquid crystal element was manufactured by a method similar to that of practical example 2-1, except that the following composition was used instead of a liquid crystal material in practical example 2-1.
Base liquid crystals with component ratios shown in Table 2-2: 70 wt %
Compound H shown in Table 2-1 as an example of a chiral compound of formula (2-IV): 13 wt %
Compound E shown in Table 2-1 as an example of a chiral compound of formula (2-V): 4 wt %
Compound C shown in Table 2-1 as an example of a chiral compound of formula (2-VI): 13 wt %
Additionally, the phase transition temperatures of the liquid crystal material were −17° C. for crystal/smectic C phase, 67° C. for a chiral smectic C phase/a smectic A phase, 82° C. for the smectic A phase/a nematic phase, and 89° C. for the nematic phase/an isotropic phase. Also, the result of the spontaneous polarization thereof which was measured by using an SSFLC element was +67 nC/cm².

Also, the orientation of the liquid crystal element in the practical example belonged to rank 3, which was relatively good.

Furthermore, the results of evaluation for the characteristics of the liquid crystal element were as follows.
Response time (VAFLC element): 0.4 ms (at electric field E=150 V/mm)
Saturation electric field (VAFLC element): 70 V
MTF ratio (VAFLC element): 0.80 (when driving at 100 Hz)

In regard to the liquid crystal element of practical example 2-3, the response time was 0.4 ms, which meant a very high speed, although the electric field for saturating the tilt angle of the optic axis was 70 V, which was relatively large.

Practical Example 2-4

A liquid crystal element was manufactured by a method similar to that of practical example 2-1, except that the following composition was used instead of a liquid crystal material in practical example 2-1.
Base liquid crystals with component ratios shown in Table 2-2: 72 wt %
Compound H shown in Table 2-1 as an example of a chiral compound of formula (2-IV): 8 wt %
Compound B shown in Table 2-1 as an example of a chiral compound of formula (2-VII): 4 wt %
Compound E shown in Table 2-1 as an example of a chiral compound of formula (2-V): 4 wt %
Compound C shown in Table 2-1 as an example of a chiral compound of formula (2-VI): 8 wt %
Additionally, the phase transition temperatures of the liquid crystal material were −17° C. for crystal/smectic C phase, 77° C. for a chiral smectic C phase/a smectic A phase, 92° C. for the smectic A phase/a nematic phase, and 95° C. for the nematic phase/an isotropic phase. Also, the result of the spontaneous polarization thereof which was measured by using an SSFLC element was +94 nC/cm².

Also, the orientation of the liquid crystal element in the practical example belonged to rank 3, which was relatively good.

Furthermore, the results of evaluation for the characteristics of the liquid crystal element were as follows.
  Response time (VAFLC element): 0.4 ms (at electric field E=150 V/mm)
  Saturation electric field (VAFLC element): 30 V
  MTF ratio (VAFLC element): 0.85 (when driving at 100 Hz)

In regard to the liquid crystal element of practical example 2-4, the response time was 0.4 ms, which was short, and the electric field for saturating the tilt angle of the optic axis was 30 V, which was small. On the other hand, the MTF value was 0.85, which was sufficient but further improvement was desired.

Practical Example 2-5

A liquid crystal element was manufactured by a method similar to that of practical example 2-1, except that the following composition was used instead of a liquid crystal material in practical example 2-1.
  Base liquid crystals with component ratios shown in the following Table 2-3: 70 wt %

TABLE 2-3

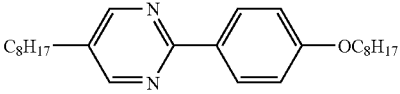
7 wt %

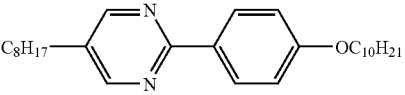
6 wt %

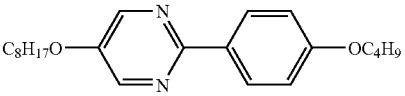
5 wt %

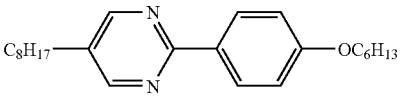
7 wt %

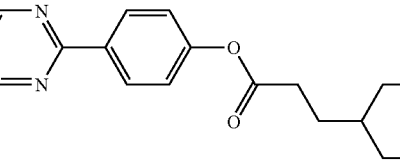
12 wt %

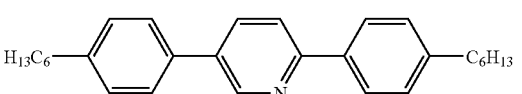
11 wt %

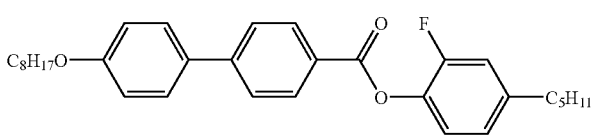
14 wt %

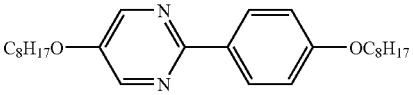
2 wt %

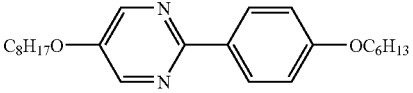
5 wt %

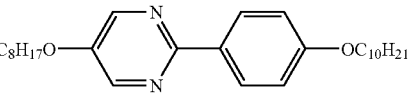
4 wt %

TABLE 2-3-continued

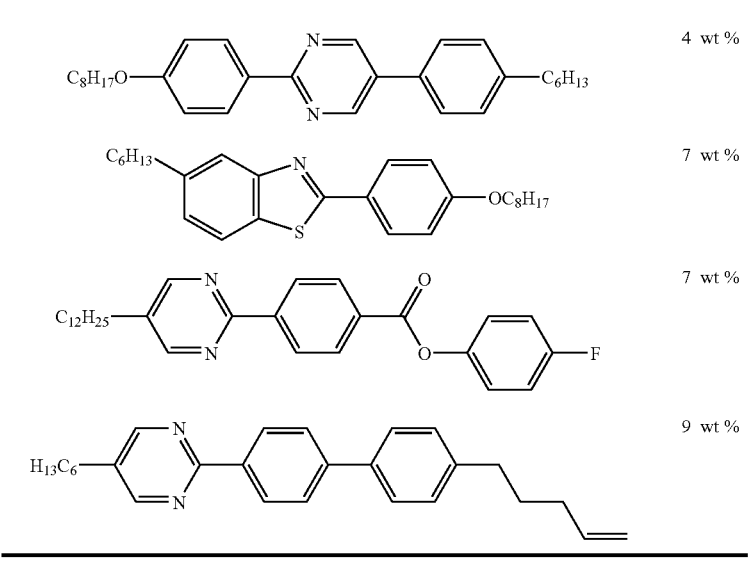

| | |
|---|---|
| (C8H17O-phenyl-pyrimidine-phenyl-C6H13) | 4 wt % |
| (C6H13-benzothiazole-phenyl-OC8H17) | 7 wt % |
| (C12H25-pyrimidine-phenyl-CO-O-phenyl-F) | 7 wt % |
| (H13C6-pyrimidine-phenyl-phenyl-alkenyl) | 9 wt % |

Compound H shown in Table 2-1 as an example of a chiral compound of formula (2-IV): 13 wt %
Compound E shown in Table 2-1 as an example of a chiral compound of formula (2-V): 4 wt %
Compound I shown in Table 2-1 as an example of a chiral compound of formula (2-VIII): 13 wt %

Additionally, the phase transition temperatures of the liquid crystal material were −10° C. for crystal/smectic C phase, 68° C. for a chiral smectic C phase/a smectic A phase, 90° C. for the smectic A phase/a nematic phase, and 96° C. for the nematic phase/an isotropic phase. Also, the result of the spontaneous polarization thereof which was measured by using an SSFLC element was +50 nC/cm².

Also, the orientation of the liquid crystal element in the practical example belonged to rank 3, which was relatively good.

Furthermore, the results of evaluation for the characteristics of the liquid crystal element were as follows.

Response time (VAFLC element): 0.5 ms (at electric field E=150 V/mm)
Saturation electric field (VAFLC element): 35 V
MTF ratio (VAFLC element): 0.90 (when driving at 100 Hz)

In regard to the liquid crystal element of practical example 2-5, the electric field for saturating the tilt angle of the optic axis was 35 V, which was small, and the MTF value at the time of electric field driving was 0.9, which was very good. That is, the MTF characteristic was improved by using Compound I. Although the response time was 0.5 ms, which meant slightly slower, no problem was found in this characteristic for practical use.

Practical Example 2-6

A liquid crystal element was manufactured by a method similar to that of practical example 2-1, except that the following composition was used instead of a liquid crystal material in practical example 2-1.

Base liquid crystals with component ratios shown in Table 2-2: 66 wt %
Compound H shown in Table 2-1 as an example of a chiral compound of formula (2-IV): 13 wt %
Compound B shown in Table 2-1 as an example of a chiral compound of formula (2-VII): 4 wt %
Compound E shown in Table 2-1 as an example of a chiral compound of formula (2-V): 4 wt %
Compound I shown in Table 2-1 as an example of a chiral compound of formula (2-VIII): 13 wt %

Additionally, the phase transition temperatures of the liquid crystal material were −17° C. for crystal/smectic C phase, 69° C. for a chiral smectic C phase/a smectic A phase, 88° C. for the smectic A phase/a nematic phase, and 89° C. for the nematic phase/an isotropic phase. Also, the result of the spontaneous polarization thereof which was measured by using an SSFLC element was +86 nC/cm².

Also, the orientation of the liquid crystal element in the practical example belonged to rank 4, which was very good.

Furthermore, the results of evaluation for the characteristics of the liquid crystal element were as follows.

Response time (VAFLC element): 0.3 ms (at electric field E=150 V/mm)
Saturation electric field (VAFLC element): 70 V
MTF ratio (VAFLC element): 0.90 (when driving at 100 Hz)

In regard to the liquid crystal element of practical example 2-6, while the ranking of the initial orientation was 4, which was good, the response time was 0.3 ms, which meant fast, and the MTF value at the time of electric field driving was 0.9, which was very good. That is, the initial orientation was improved by the addition of Compound B. Although the electric field for saturating the tilt angle of the optic axis was 75 V, which was slightly larger, no problem was found in this characteristic for practical use.

The results of evaluation in all of practical example 2-1 to practical example 2-6 are shown in Table 2-4.

TABLE 2-4

| | Base liquid crystal | Added compounds | | |
|---|---|---|---|---|
| | | (I) | (II) | (III) |
| Practical example 1 | Table 2-2 | A, B | E | — |
| Practical example 2 | Table 2-2 | A, B | E | C |
| Practical example 3 | Table 2-2 | H | E | C |

TABLE 2-4-continued

| | | | | |
|---|---|---|---|---|
| Practical example 4 | Table 2-2 | H, B | E | C |
| Practical example 5 | Table 2-3 | H | E | I |
| Practical example 6 | Table 2-2 | H, B | E | I |
| Comparison example | Table 2-2 | A, B | — | C |

| | Orientation ranking | Saturation electric field | | Response time | | MTF ratio | |
|---|---|---|---|---|---|---|---|
| Practical example 1 | 2 | Δ | 45 V | ◎ | 1.2 ms | Δ | 0.60 | Δ |
| Practical example 2 | 3 | ○ | 40 V | ◎ | 0.6 ms | ○ | 0.85 | ○ |
| Practical example 3 | 3 | ○ | 70 V | ○ | 0.4 ms | ◎ | 0.80 | ○ |
| Practical example 4 | 3 | ○ | 30 V | ◎ | 0.4 ms | ◎ | 0.85 | ○ |
| Practical example 5 | 3 | ○ | 35 V | ◎ | 0.5 ms | ○ | 0.90 | ◎ |
| Practical example 6 | 4 | ◎ | 70 V | ○ | 0.3 ms | ◎ | 0.90 | ◎ |
| Comparison example | 1 | X | — | | — | | — | |

Practical Example 2-7

In the practical example, the relationship between the total concentration of each of various combinations of chiral compounds and the response time was investigated. Specifically, a liquid crystal element was manufactured by a method similar to that of practical example 2-1, except that used was a liquid crystal material provided by changing the total concentration of chiral compounds for each of a combination of compounds A, B, C and E (Symbol ●), combination of compounds A, B and E (Symbol ○), combination of compounds H, B, I and E (Symbol ▲), combination of compounds H, B, C and E (Symbol Δ), combination of compounds H, C and E (Symbol X), and combination of compounds H, I and E (Symbol □), among the chiral compounds shown in Table 2-1 and by mixing it with a base liquid crystal with a composition shown in Table 2-2 or Table 2-3, in practical example 2-1. Then, the response time of each liquid crystal element was measured when electric filed E=150V/mm.

Figure 9:
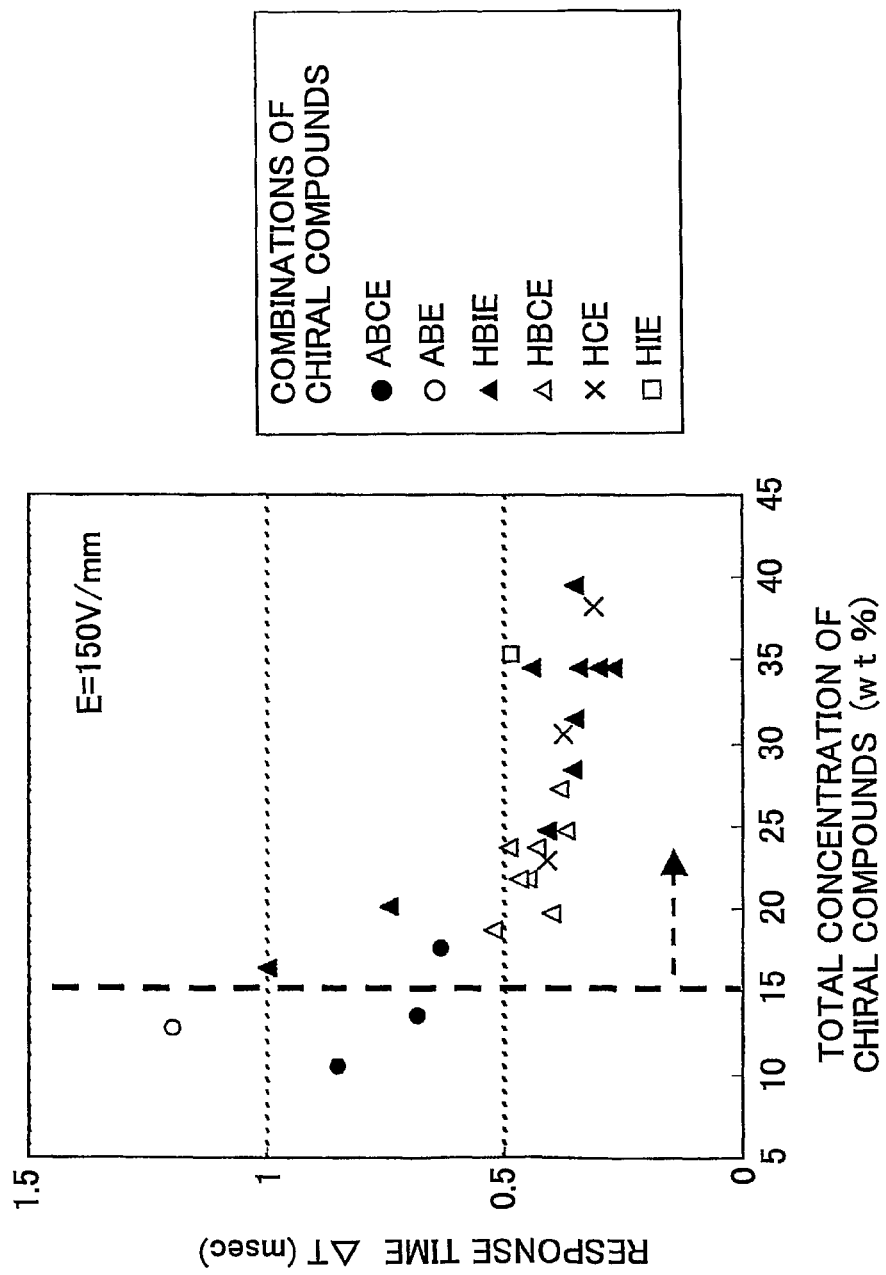
FIG. 9 is a correlation diagram of the quantity of chiral compounds added in a liquid crystal layer and a response time.

The relationship between the total concentration of each of various combinations of the chiral compounds with respect to the base liquid crystal shown in Table 2-2 or Table 2-3 and the response time is shown in FIG. 9.

Even if a combination of chiral compounds is changed, the spontaneous polarization was small and the response time was degraded to be equal to or greater than 1.0 ms when the content of liquid crystals was equal to or greater than 85% by weight which show almost similar characteristics in regard to the change of the response time per the total content. If the response time was longer than 1.0 ms, the feature of a ferroelectric liquid crystal material was not utilized. Herein, when the rate of the chiral compounds was equal to or greater than 15% by weight, in other words, when the content of a base liquid crystal was less than 85% by weight, the spontaneous polarization was greater than approximately 40 nC/cm$^2$ and the response time of the liquid crystal element could be equal to or less than 1.0 ms, which meant high speed. More preferably, when the content of the chiral compounds was equal to or greater than 20% by weight, the spontaneous polarization was further increased and the response time of the liquid crystal element was equal to or less than 0.5 ms, which meant a high-speed.

Next, MTF values were measured for liquid crystal elements manufactured by changing the total concentration of chiral compounds for each of the combinations described above.

Figure 10:
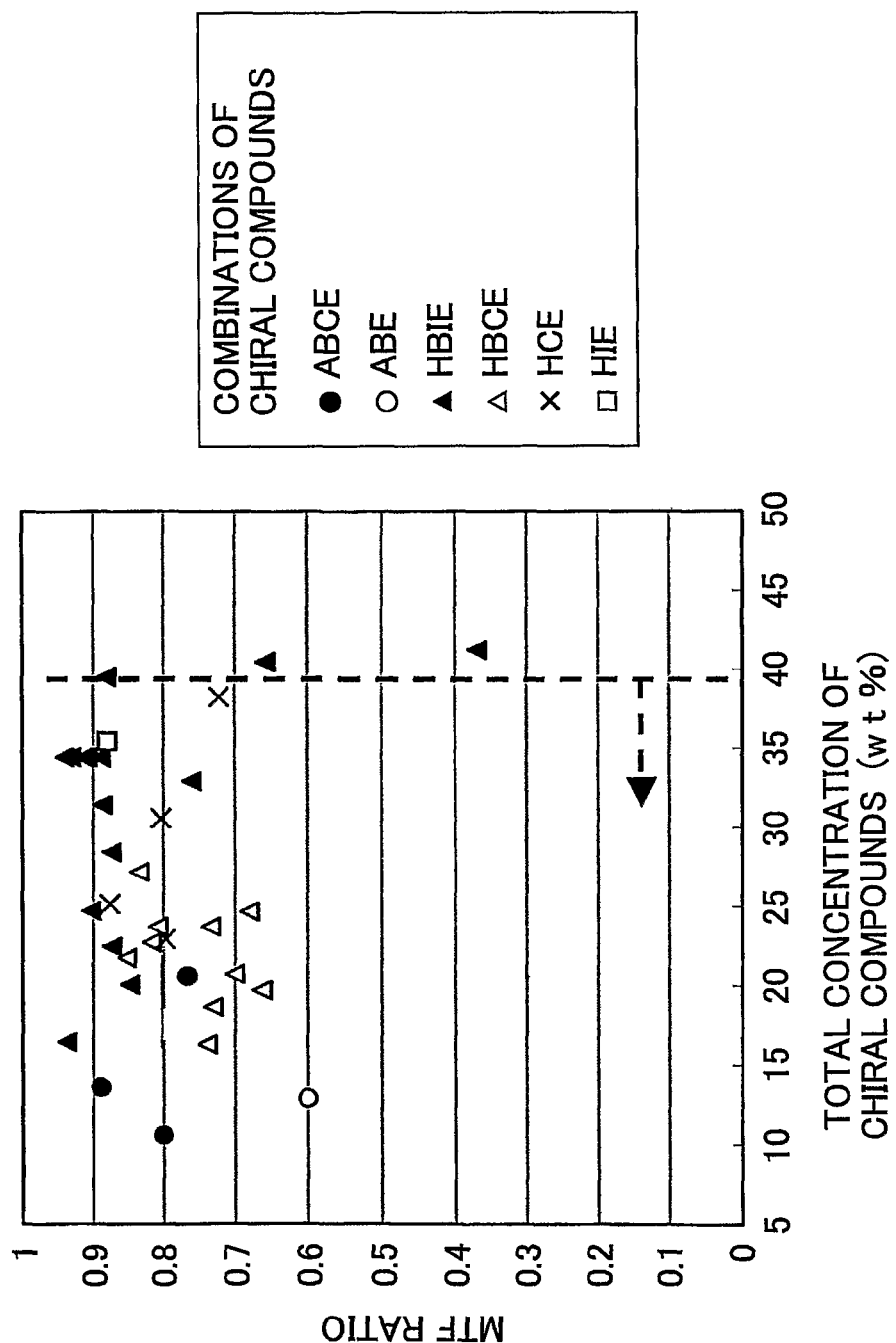
FIG. 10 is a correlation diagram of the quantity of chiral compounds added in a liquid crystal layer and a MTF ratio.

The results are shown in FIG. 10. Although some deviation is found in regard to a certain combination of chiral compounds, the MTF value tends to be degraded with the increase of the total concentration. Particularly, when it was greater than 40% by weight, it was lowered rapidly. It is considered that the reason was phase separation or crystallization of the chiral compound(s).

Thus, the rate of a chiral compound(s) contained in a liquid crystal layer in a liquid crystal element according to an embodiment of the present invention is preferably equal to or greater than 5% by weight and equal to or less than 40% by weight, and more preferably, equal to or greater than 20% by weight and equal to or less than 40% by weight.

Practical Example 2-8

An image displaying apparatus as shown in FIG. 7 was manufactured while the liquid crystal element of practical example 2-6 was used as an optical path deflecting element. For an image displaying element (transmission-type liquid crystal panel 24), a polysilicon TFT liquid crystal light valve with a width across corner of 0.9 inch and an XGA (1024×768 dots) was used. Herein, the pitch of picture elements was approximately 18 μm along each of the longitudinal and lateral directions and the numerical aperture of the picture element was approximately 50%. Also, a micro-lens array was provided at the light source side of the image displaying element (transmission-type liquid crystal panel 24) in order to improve the light collection rate in regard to illumination light. In the practical example, LED light sources of RGB colors were used as a light source and a so-called field sequential method was employed which performed a color display by switching the colors of light for illuminating one liquid crystal panel 24 described above at high speed.

In the practical example, the frame frequency for displaying an image was 60 Hz and the sub-field frequency for apparently increasing the number of picture elements at 4 times as many as them by means of pixel shifting was 240 Hz which was 4 times as many as the frame frequency. Also, in order to further divide one sub-frame into 3 frames for the colors, images corresponding to respective colors were switched at 720 Hz. An observer could view a full color image by switching on and off the LED light sources corresponding to respective colors in accordance with the timing of displaying respective color images on the liquid crystal panel.

In the practical example, two liquid crystal element of practical example 2-6 were used as a optical path deflecting element 20 in which the first optical path deflecting element and the second optical path deflecting element were provided at the entrance side and the exit side, respectively. They were arranged such that the directions of line electrodes of them were orthogonal to each other and corresponded to the directions of arraying the picture elements of the image displaying element (transmission-type liquid crystal panel 24).

Also, in the practical example, exit light from the liquid crystal light valve had been linearly polarized light and the light valve was arranged such that the direction of polarization corresponded to the direction of optical path deflection of the first optical path deflecting element. In addition, a linearly-polarizing plate as polarization direction controlling means was provided at the entrance side of the optical path deflecting element 20 in order to ensure the degree of polarization of light incident on the optical path deflecting element. Thus, the generation of noisy light which was not deflected by the first optical path deflecting element but went straight may be prevented.

Furthermore, a polarization plane rotation element was provided between the first and second optical path deflecting elements. The polarization plane rotation element was manufactured as follows. That is, a polyimide-type orientation material was spin-coated on a thin glass substrate (3 cm×4 cm, thickness: 0.15 mm) so as to form an orientation film with a thickness of approximately 0.1 μm. After annealing treatment of the glass substrate, rubbing treatment was conducted. A spacer with a thickness of 8 μm was sandwiched between the two glass substrates at marginal portions thereof. Then, the upper and lower substrates were laminated to each other such that the rubbing directions of them were orthogonal to each other, so as to obtain an empty cell. A material provided by mixing an appropriate amount of a chiral material into a nematic liquid crystal with a positive dielectric anisotropy was injected into the cell under an ordinary pressure so as to obtain a TN liquid crystal cell as a polarization plane rotation element in which the orientations of liquid crystal molecules were twisted by 90 degrees. Since no electrode was provided on the cell, it functioned as a simple polarization plane rotation element.

In regard to the arrangement of the polarization plane rotation element, it was arranged to be sandwiched between the two optical path deflecting elements such that the polarization plane of light exiting from the first optical path deflecting element corresponded to the rubbing direction of the entrance face of the polarization plane rotation element. The polarization plane of light exiting from the first optical path deflecting element was rotated by 90 degrees and corresponded to the polarization direction of the second optical path deflecting element, due to the polarization plane rotation element. Thus manufactured pixel shift element composed of the first optical path deflecting element, the polarization plane rotation element, and the second optical path deflecting element was located just behind the image displaying element (transmission-type liquid crystal panel 24).

In the practical example, a rectangular wave voltage for driving the pixel shift element was ±6 keV and the frequency thereof was 60 Hz. Also, the timing of driving was set such that phases along the longitudinal and lateral directions of each of the two elements were shifted by 90 degrees and 4 directional image shifting was attained. Under the conditions, the shift quantity of the optical path deflecting element was 9 μm.

In the practical example, when a sub-field image which should be displayed on the image displaying element was recreated under a condition of 240 Hz, a highly fine image could be displayed in which the number of the picture elements along the two directions, namely, both the longitudinal directions and lateral directions, was apparently increased 4 times as many as the number of the picture elements. The switching time of the optical path deflecting element was approximately 0.3 ms and a sufficient efficiency of light utilization was obtained. Also, for example, no flicker was observed.

APPENDIX

Typical embodiments (1-1) to (1-6) and (2-1) to (2-10) of the present invention are described below.

One of the objects of at least one of the typical embodiments is to provide a liquid crystal element which includes a layer of ferroelectric liquid crystal and may be excellent in orientation and stable within an operating temperature range.

Another object of at least one of the typical embodiments is to provide a liquid crystal element which may be excellent in orientation and responsiveness and/or an optical characteristic and is capable of driving an optic axis under low electric field conditions.

Another object of at least one of the typical embodiments is to provide an optical path deflecting element which includes the liquid crystal element as described above and may parallel shift the path of transmitted light at high speed.

Another object of at least one of the typical embodiments is to provide an image displaying apparatus which includes the optical path deflecting element as described above and uses an image displaying device with a small number of a picture element(s), so that a highly fine display may be attained.

Embodiment (1-1) is a liquid crystal element comprising a pair of transparent substrates, a liquid crystal layer which fills in between the pair of substrates and can form a chiral smectic C phase in homeotropic orientation, and an electrode which generates, at least, an electric field (parallel electric field) in directions parallel to a principal face of the substrate for the liquid crystal layer, characterized in that the liquid crystal layer comprises, at least, a chiral compound of the following general formula (1-I)

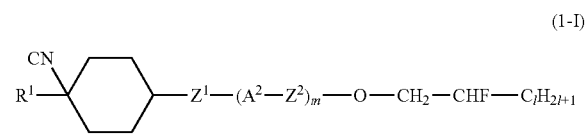

(1-I)

in a base liquid crystal material which can provide a phase sequence of an isotropic liquid phase, a nematic phase, a smectic A phase and a smectic C phase from a higher temperature side, wherein $R^1$ is an alkyl group or alkenyl group whose carbon number is any of 1 to 15 and which is not substituted, one carbon of which is substituted with —CN, or at least one hydrogen atom of which is replaced by F or Cl, a $CH_2$ group of which may be replaced by —O—, —CO—, —O—CO—, —CO—O— or —O—CO—O—, $A^2$ is 1,4-phenylene group, pyridine-2,5-diyl, pyrimidine-2,5-diyl, 1,3,4-thiadiazole-2,5-diyl, or 1,2,4-thiadiazole-3,5-diyl, one or two hydrogen atoms of which may be replaced by F, each of $Z^1$ and $Z^2$ is independently —CO—O—, —O—CO—, or a single bond, m=1 or 2, and $1 \leq l \leq 9$.

Embodiment (1-2) is the liquid crystal element as described in embodiment (1-1) above, characterized in that the chiral compound of general formula (1-I) is a compound of the following formula (1-II)

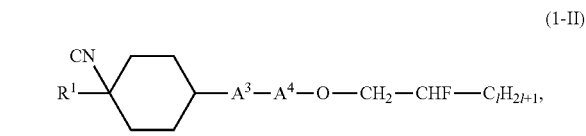

(1-II)

wherein each of $A^3$ and $A^4$ is independently selected from a 1,4-phenylene group, pyridine-2,5-diyl and pyrimidine-2,5-diyl, one or two hydrogen atoms of which may be replaced by F, $R^2$ is an alkyl group or alkenyl group whose carbon number is any of 1 to 15, and $1 \leq l \leq 9$.

Embodiment (1-3) is the liquid crystal element as described in embodiment (1-2), characterized in that the chiral compound of formula (1-II) is a compound of the following formula (1-III)

(1-III)

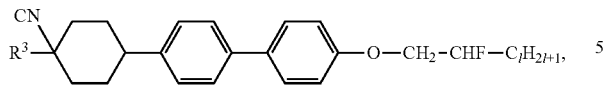

wherein $R^3$ is an alkyl group or alkenyl group whose carbon number is any of 1 to 15, and $1 \leq l \leq 9$.

Embodiment (1-4) is the liquid crystal element as described in any of embodiments (1-1) to (1-3) above, characterized in that the base liquid crystal material comprises at least one kind of phenylpyrimidine compound.

Embodiment (1-5) is an optical path deflecting element which deflects an optical path of light in response to an electric signal, characterized by comprising the liquid crystal element as described in any of embodiments (1-1) to (1-4) above, making light incident on the liquid crystal element be linearly polarized light, and setting a polarization plane of the linearly polarized light to be in directions orthogonal to a direction of an applied parallel electric field in the element, whereby a relative position of an optical path of exit light with respect to an optical path of incident light can be parallel shifted.

Embodiment (1-6) is an image displaying apparatus comprising an image displaying element in which plural picture elements capable of controlling light according to image information are two-dimensionally arrayed, a light source, an illumination device which illuminates the image displaying element, an optical device configured to observe an image pattern displayed on the image displaying element, a display driving device which forms an image field based on plural sub-fields provided by temporally dividing it, and an optical path deflecting element which deflects an optical path of light which exits from each picture element, in which apparatus the number of picture elements of the image displaying element is apparently increased by displaying on the image displaying element an image pattern corresponding to a display which is positionally shifted in accordance with a deflection of an optical path for each sub-field which is provided by the optical path deflecting element, thereby conducting display, characterized by comprising the optical path deflecting element as described in embodiment (1-5) as the optical path deflecting element.

Embodiment (2-1) is a liquid crystal element comprising a pair of transparent substrates, a liquid crystal layer which fills in between the pair of substrates and can form a chiral smectic C phase in homeotropic orientation, and an electrode which generates, at least, an electric field (parallel electric field) in directions parallel to a principal face of the substrate for the liquid crystal layer, characterized in that the liquid crystal layer comprises, at least, a chiral compound of the following general formula (2-I)

(2-I)

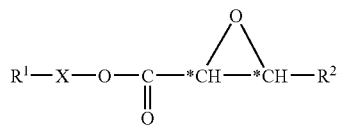

and a chiral compound of the following general formula (2-II)

(2-II)

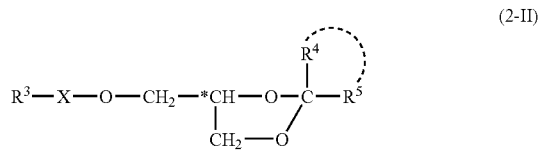

in a base liquid crystal material which can provide a phase sequence of an isotropic liquid phase, a nematic phase, a smectic A phase and a smectic C phase from a higher temperature side, in which formula (2-I), an X group is $-(A^1)_h-(B^1)_i-(A^2)_j-(B^2)_k-(A^3)_l-$, $R^1$ represents a linear alkyl group or alkoxy group whose carbon number is any of 3 to 12, $R^2$ represents an alkyl group whose carbon number is any of 3 to 12 and which may be branched, * represents a chiral center, each of h and j is 0, 1 or 2, each of i and k is 0 or 1, l is 0, 1 or 2, wherein i is 0 when both or one of h and j is 0, k is 0 when l is 0, and h+j+l is 2 or 3, each of $A^1$ and $A^2$ represents a group selected from formulas (2-a)

(2-a)

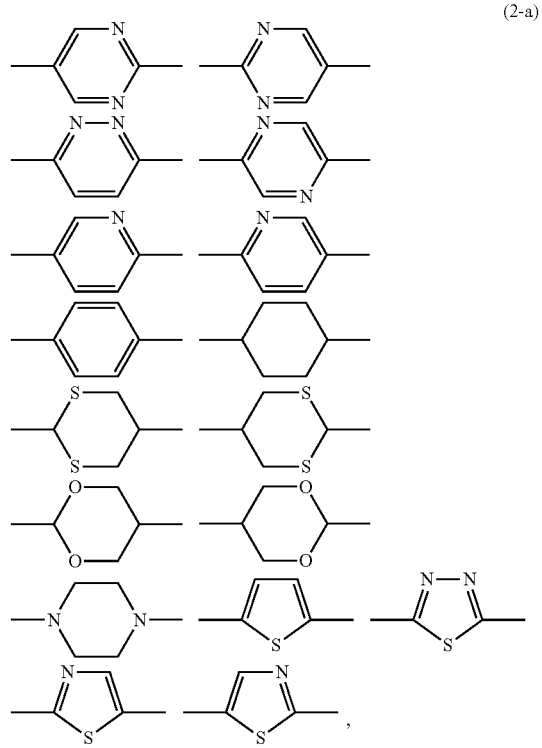

$A^3$ represents a group selected from formulas (2-b)

(2-b)

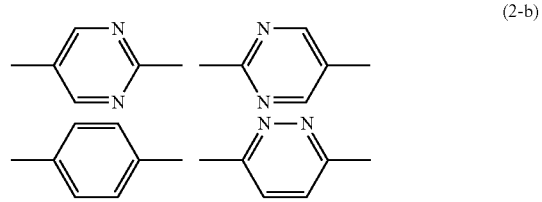

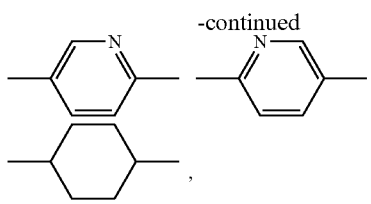

each of $B^1$ and $B^2$ is —CO—O—, —O—CO—, —CH$_2$O— or —OCH$_2$—, and in which formula (2-II), an X group is -(A$^1$)$_h$-(B$^1$)$_i$-(A$^2$)$_j$-(B$^2$)$_k$-(A$^3$)$_l$-, $R^3$ represents an alkyl group or alkoxy group whose carbon number is any of 3 to 12 and which may be branched, each of $R^4$ and $R^5$ represents a linear alkyl group whose carbon number is any of 3 to 5 or an alkyl group which has a six or more-membered ring structure and whose ends bond to each other, and each of $A^1, A^2, A^3, B^1, B^2$, h, i, j, k and l is defined identically to that of formula (2-I) and may be independently identical to or different from that of formula (2-I).

Embodiment (2-2) is the liquid crystal element as described in embodiment (2-1) above, characterized in that a chiral compound of the following general formula (2-III)

(2-III)

has been further added into the liquid crystal layer, wherein an X group is -(A$^1$)$_h$-(B$^1$)$_i$-(A$^2$)$_j$-(B$^2$)$_k$-(A$^3$)$_l$-, a Y group is

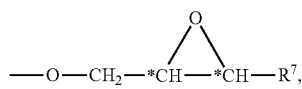

each of $A^1, A^2, A^3, B^1, B^2$, h, i, j, k and l is defined identically to that of formula (2-I) and may be independently identical to or different from that of formula (2-I) or formula (2-II), $R^6$ is an alkyl group or alkoxy group whose carbon number is any of 3 to 12 and which may be branched or the Y group, and $R^7$ represents an alkyl group whose carbon number is any of 3 to 12 and which may be branched.

Embodiment (2-3) is the liquid crystal element as described in embodiment (2-2) above, characterized in that the chiral compound of general formula (2-I) is a compound of the following formula (2-IV)

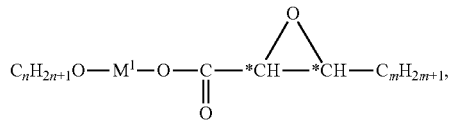
(2-IV)

wherein each of n and m is an integer of 3 to 12, wherein n and m may be identical numerical values, $M^1$ is a mesogenic and aromatic unit (mesogenic group) and represents a group selected from formulas (2-c)

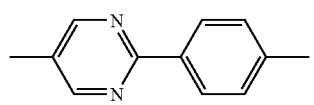
(2-c)

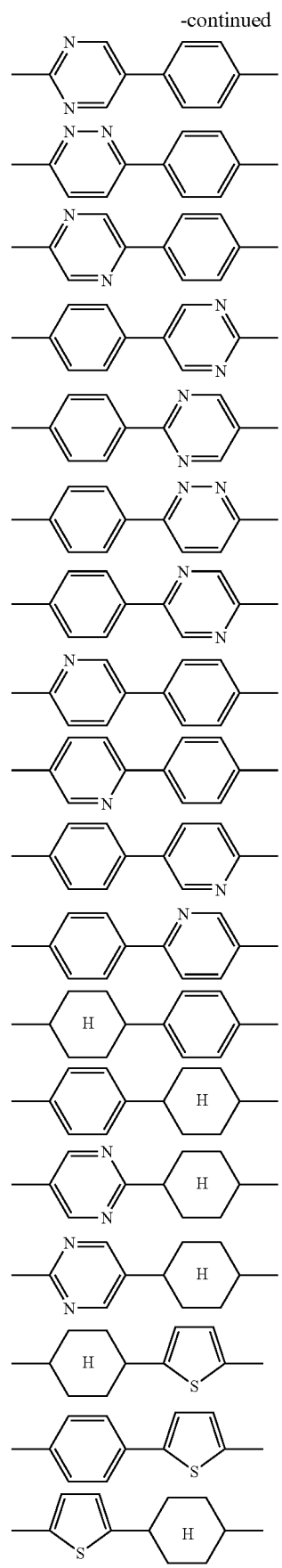

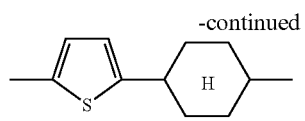

the chiral compound of general formula (2-II) is a compound of the following formula (2-V)

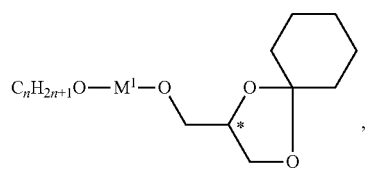
(2-V)

wherein n is an integer of 3 to 12, and $M^1$ is defined identically to that of formula (2-IV) and may be identical to or different from that of formula (2-IV), and the chiral compound of general formula (2-III) is a compound of the following formula (2-VI)

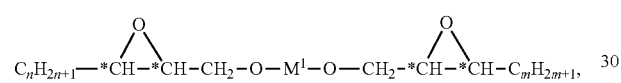
(2-VI)

wherein each of n and m is an integer of 3 to 12, wherein n and m may be identical numerical values, n and m in any of formula (2-IV) to formula (2-VI) may be numerical values independent of each other, and $M^1$ is defined identically to that of formula (2-IV) and may be identical to or different from that of formula (2-IV) or formula (2-V).

Embodiment (2-4) is the liquid crystal element as described in embodiment (2-3) above, characterized in that a compound of the following formula (2-VII)

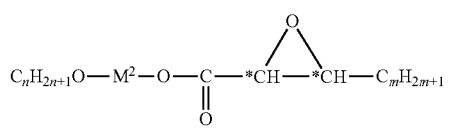
(2-VII)

has been further added as the chiral compound of general formula (2-I), wherein each of n and m is an integer of 3 to 12, wherein n and m may be identical numerical values and $M^2$ is a mesogenic and aromatic unit (mesogen) and represents a group selected from formulas (2-d)

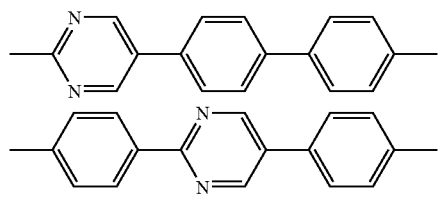
(2-d)

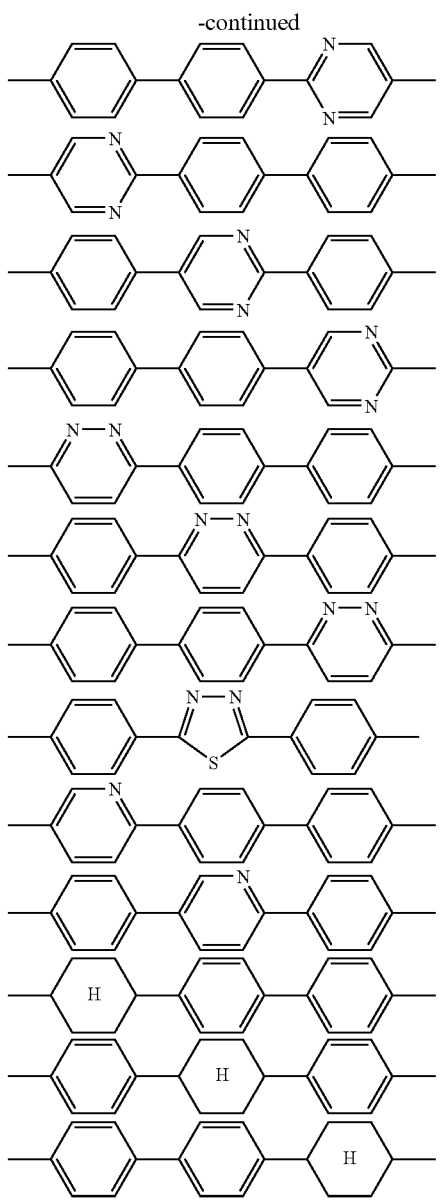

Embodiment (2-5) is the liquid crystal element as described in embodiment (2-2), characterized in that the chiral compound of general formula (2-I) is a compound of formula (2-IV), the chiral compound of general formula (2-II) is a compound of formula (2-V), and the chiral compound of general formula (2-III) is a compound of the following formula (2-VIII)

(2-VIII)

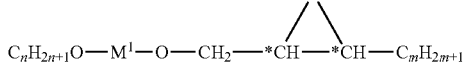

wherein each of n and m is an integer of 3 to 12, wherein n and m may be identical numerical values, n and m in any of formula (2-IV) to formula (2-VIII) may be numerical values independent of each other, and $M^1$ is defined identically to that of formula (2-IV) and may be identical to or different from that of formula (2-IV) or formula (2-V).

Embodiment (2-6) is the liquid crystal element as described in embodiment (2-5) above, characterized in that the compound of formula (2-VII) has been further added as the chiral compound of general formula (2-I).

Embodiment (2-7) is the liquid crystal element as described in any of embodiments (2-1) to (2-6) above, characterized in that a ratio of the chiral compound comprised in the liquid crystal layer is equal to or greater than 15% by weight and equal to or less than 40% by weight.

Embodiment (2-8) is the liquid crystal element as described in any of embodiments (2-1) to (2-7) above, characterized in that the base liquid crystal material comprises at least a phenylpyrimidine compound.

Embodiment (2-9) is an optical path deflecting element which deflects an optical path of light in response to an electric signal, characterized by comprising the liquid crystal element as described in any of embodiments (2-1) to (2-8) above, making light incident on the liquid crystal element be linearly polarized light, and setting a polarization plane of the linearly polarized light to be in directions orthogonal to a direction of an applied parallel electric field in the element, whereby a relative position of an optical path of exit light with respect to an optical path of incident light can be parallel shifted.

Embodiment (2-10) is an image displaying apparatus comprising an image displaying element in which plural picture elements capable of controlling light according to image information are two-dimensionally arrayed, a light source, an illumination device which illuminates the image displaying element, an optical device configured to observe an image pattern displayed on the image displaying element, a display driving device which forms an image field based on plural sub-fields provided by temporally dividing it, and an optical path deflecting element which deflects an optical path of light which exits from each picture element, in which apparatus the number of picture elements of the image displaying element is apparently increased by displaying on the image displaying element an image pattern corresponding to a display which is positionally shifted in accordance with a deflection of an optical path for each sub-field which is provided by the optical path deflecting element, thereby conducting display, characterized by comprising the optical path deflecting element as described in embodiment (2-9) above, as the optical path deflecting element.

According to any of embodiments (1-1) to (1-3), a liquid crystal layer with no defective orientation may be obtained even for a liquid crystal element with a thick layer of a liquid crystal in vertical orientation, so as to prevent light scattering.

According to embodiment (1-4), a liquid crystal with a low viscosity and high speed responsiveness layer may be obtained by forming a stable smectic phase at or near room temperature.

According to embodiment (1-5), the path of transmitted light may be parallel shifted with an operation of inverting the tilt angle or tilt directions of the optic axis of a liquid crystal layer. Then, since the ferroelectric liquid crystal material as described above can be used, the operation of inverting the optic axis may be performed at a high speed so that a high speed shift of the light path may be attained.

According to embodiment (1-6), since an optical path deflecting element with a good orientation and high speed responsiveness can be used, high speed deflection of a light path may be attained for a sub-field image, and thereby, an apparently highly fine image may be displayed. Also, since switching time between sub-field images may be reduced due to the high speed responsiveness, the temporal efficiency of light utilization may be improved.

According to embodiment (2-1), a liquid crystal layer with no defective orientation may be obtained even for a liquid crystal element with a thick layer of a liquid crystal in vertical orientation, so as to prevent light scattering. Also, a liquid crystal layer with a relatively weak-strength electric field for saturating the tilt angle of an optic axis so that a sufficient tilt angle of the optic axis may be obtained even under low electric field conditions.

According to embodiment (2-2), a liquid crystal layer with no defective orientation may be obtained even for a liquid crystal element with a thick layer of a liquid crystal in vertical orientation, so as to prevent light scattering. Also, a liquid crystal element with a relatively weak-strength electric field for saturating the tilt angle of an optic axis and excellent responsiveness may be obtained.

According to embodiment (2-3), a liquid crystal layer with no defective orientation may be obtained even for a liquid crystal element with a thick layer of a liquid crystal in vertical orientation, so as to prevent light scattering. Also, the spontaneous polarization of a liquid crystal layer may be increased, and therefore, a liquid crystal element with a very excellent responsiveness may be obtained.

According to embodiment (2-4), a liquid crystal layer with no defective orientation may be obtained even for a liquid crystal element with a thick layer of a liquid crystal in vertical orientation, so as to prevent light scattering. Also, a liquid crystal element with a very weak-strength electric field for saturating the tilt angle of an optic axis and very excellent responsiveness may be obtained. Particularly, when a 2,5-diphenylpyrimidine group is used as a mesogenic group, the effect of reducing a saturation electric field may be significant.

According to embodiment (2-5), a liquid crystal layer with no defective orientation may be obtained even for a liquid crystal element with a thick layer of a liquid crystal in vertical orientation, so as to prevent light scattering. Also, a liquid crystal element with a very weak-strength electric field for saturating the tilt angle of an optic axis and a very excellent MTF characteristic at the time of electric field driving may be obtained.

According to embodiment (2-6), a liquid crystal layer with no defective orientation may be obtained even for a liquid crystal element with a thick layer of a liquid crystal in vertical orientation, so as to prevent light scattering. Also, a liquid crystal element with a very short response time and a very excellent MTF characteristic at the time of electric field driving may be obtained. Particularly, when a 2,5-diphenylpyrimidine group is used as a mesogenic group in formula (2-VII), the effect of improving the vertical orientation and responsiveness may be significant.

According to embodiment (2-7), the spontaneous polarization may be increased by making the rate of a chiral compound by equal to or greater than 15% by weight so that the response time may be equal to or less than 1.0 ms, that is, speeding up may be attained. On the other hand, the degradation of an optical property, such as generation of white turbidity caused by phase separation, may be prevented by making it be equal to or less than 40% by weight.

According to embodiment (2-8), a smectic phase which is stable at or near room temperature may be formed and a liquid crystal layer with a low viscosity and high speed responsiveness may be obtained.

According to embodiment (2-9), the path of transmitted light may be parallel shifted with an operation of inverting the tilt angle or tilt directions of the optic axis of a liquid crystal layer. Then, since the ferroelectric liquid crystal material as described above can be used, the operation of inverting the optic axis may be performed at a high speed so that a high speed shift of the light path may be attained.

According to embodiment (2-10), since an optical path deflecting element with a good orientation and high speed responsiveness can be used, high speed deflection of a light path may be attained for a sub-field image, and thereby, an apparently highly fine image may be displayed. Also, since switching time between sub-field images may be reduced due to the high speed responsiveness, the temporal efficiency of light utilization may be improved.

The present invention is not limited to the specifically disclosed embodiments, and variations and modifications may be made without departing from the scope of the present invention.

The present application claims the benefit of the priorities of Japanese Patent Application No. 2006-054850 filed on Mar. 1, 2006 and Japanese Patent Application No. 2006-054851 filed on Mar. 1, 2006, the entire contents of which applications are hereby incorporated by reference.

INDUSTRIAL APPLICABILITY

The present invention may be applied to a liquid crystal element which changes the direction of tilt of the optic axis of a uniaxial material by means of an electric signal, an optical path deflecting element which includes the liquid crystal element and deflects the optical path of light by means of an electric signal, and an image displaying apparatus which includes the optical path deflecting element. The optical path deflecting element may be used in, for example, a projector, a head mount display, an optical switch, or an optically imaging system.

The invention claimed is:

1. A liquid crystal element comprising:
a pair of transparent substrates;
a liquid crystal layer which fills in between the pair of substrates and can form a chiral smectic C phase in homeotropic orientation, a thickness of the liquid crystal layer being 70 μm or more; and
an electrode which generates, at least, an electric field in directions parallel to a principal face of the substrate for the liquid crystal layer; wherein
the liquid crystal layer comprises, at least, 10% by weight of a chiral compound in a base liquid crystal material which can provide a phase sequence of an isotropic liquid phase, a nematic phase, a smectic A phase and a smectic C phase from a higher temperature side,
wherein the base liquid crystal material comprises at least one of

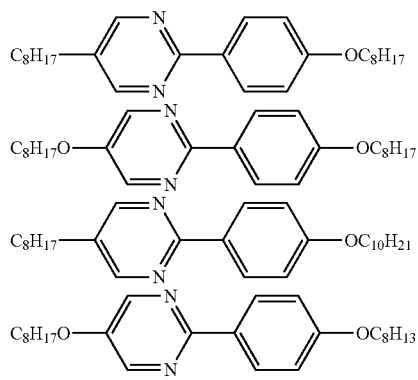

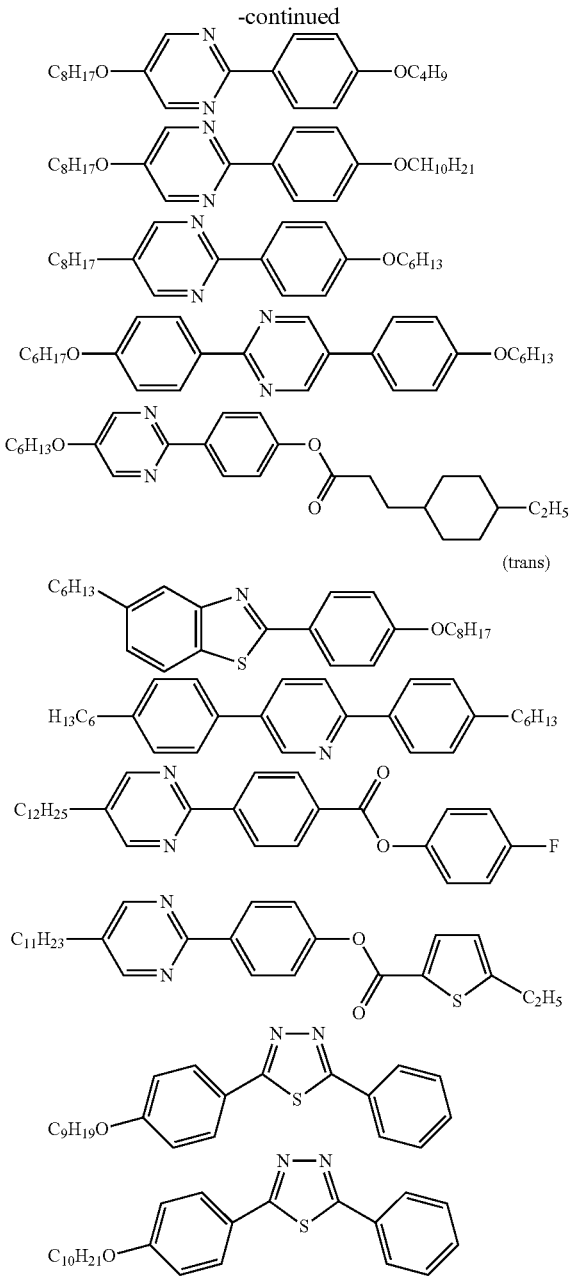

wherein the chiral compound is a compound of the following formula (1-III)

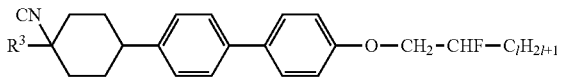

wherein
$R^3$ is an alkyl group or alkenyl group whose carbon number is any of 1 to 15, and $1<l<9$.